(12) United States Patent
Schönleber et al.

(10) Patent No.: US 10,234,265 B2
(45) Date of Patent: Mar. 19, 2019

(54) DISTANCE MEASURING DEVICE AND METHOD FOR MEASURING DISTANCES

(71) Applicant: Precitec Optronik GmbH, Neu-Isenburg (DE)

(72) Inventors: Martin Schönleber, Aschaffenburg (DE); Stephan André, Rodgau (DE)

(73) Assignee: Precitec Optronik GmbH (DE)

( * ) Notice: Subject to any disclaimer, the term of this patent is extended or adjusted under 35 U.S.C. 154(b) by 105 days.

(21) Appl. No.: 15/433,173

(22) Filed: Feb. 15, 2017

(65) Prior Publication Data

US 2018/0164089 A1    Jun. 14, 2018

(30) Foreign Application Priority Data

Dec. 12, 2016   (DE) .................. 10 2016 124 009

(51) Int. Cl.
*G01B 9/02*    (2006.01)

(52) U.S. Cl.
CPC ..... *G01B 9/02035* (2013.01); *G01B 9/02063* (2013.01); *G01B 9/02072* (2013.04); *G01B 9/02091* (2013.01)

(58) Field of Classification Search
CPC ............ G01B 9/02035; G01B 9/02063; G01B 9/02072; G01B 9/02091
See application file for complete search history.

(56) References Cited

U.S. PATENT DOCUMENTS 4,861,131 A   8/1989  Bois et al.
5,276,631 A   1/1994  Popovic et al.
5,392,124 A   2/1995  Barbee
5,532,815 A   7/1996  Kipman et al.
5,691,540 A   11/1997 Halle et al.
(Continued)

FOREIGN PATENT DOCUMENTS

CN   101365375   2/2009
CN   101393015   3/2009
(Continued)

OTHER PUBLICATIONS

Knuttel, Dr. Alexander; "Non-compact Roughness and 3D Topography Evaluation of grinded Wafers down to nm level", Dec. 1, 2010, 25 pgs.
(Continued)

*Primary Examiner* — Michael A Lyons
(74) *Attorney, Agent, or Firm* — Taylor English Duma LLP

(57) ABSTRACT

A device for measuring a distance to an object comprises a beam splitter for splitting broadband coherent light emitted by a light source in measuring light which is guided through an object arm to the object to be measured and in reference light which is guided to a reference arm. The object arm includes a focusing optics with a focus movable along an optical axis of the object arm. The focusing optics comprises a movable optical element and is configured such that a movement of the movable optical element along the optical axis causes a higher movement of the focus of the focusing optics along the optical axis. The movable optical element of the focusing optics is coupled to the reference arm such that the optical path length of the reference arm can be tracked synchronously with and dependent on the movement of the focus of the focusing optics.

20 Claims, 24 Drawing Sheets

(56) References Cited

U.S. PATENT DOCUMENTS

| | | | |
|---|---|---|---|
| 5,905,572 A | 5/1999 | Li | |
| 6,057,920 A * | 5/2000 | Fercher | G01B 9/04 |
| | | | 356/497 |
| 6,099,522 A | 8/2000 | Knopp et al. | |
| 6,396,069 B1 | 5/2002 | MacPherson et al. | |
| 6,672,943 B2 | 1/2004 | Vogtmann et al. | |
| 6,673,654 B2 | 1/2004 | Ohno et al. | |
| 6,686,270 B1 | 2/2004 | Subramanian et al. | |
| 6,768,552 B2 | 7/2004 | Takahashi et al. | |
| 6,806,969 B2 | 10/2004 | Clifford, Jr. et al. | |
| 6,887,126 B2 | 5/2005 | Brouillette et al. | |
| 6,897,964 B2 | 5/2005 | Takahashi et al. | |
| 7,271,916 B2 | 9/2007 | Jasapara et al. | |
| 7,306,696 B2 | 12/2007 | Lian et al. | |
| 7,307,735 B2 | 12/2007 | Hecht et al. | |
| 7,443,517 B2 | 10/2008 | Sawabe et al. | |
| 7,477,401 B2 | 1/2009 | Marx et al. | |
| 7,525,732 B2 | 4/2009 | Uehara et al. | |
| 7,652,774 B2 | 1/2010 | Lian et al. | |
| 7,705,995 B1 | 4/2010 | Johs et al. | |
| 7,738,113 B1 | 6/2010 | Marx et al. | |
| 7,826,068 B2 | 11/2010 | Czerkas | |
| 7,853,429 B2 | 12/2010 | Fettig et al. | |
| 8,716,039 B2 | 5/2014 | Dusemund | |
| 8,982,339 B2 | 3/2015 | Schonleber et al. | |
| 9,295,391 B1 | 3/2016 | Tearney | |
| 9,297,645 B2 | 3/2016 | Schonleber | |
| 9,494,409 B2 | 11/2016 | Schonleber | |
| 9,500,471 B2 | 11/2016 | Michelt | |
| 2002/0148983 A1 | 10/2002 | Inoue et al. | |
| 2002/0153500 A1 | 10/2002 | Fordahl et al. | |
| 2003/0016353 A1 | 1/2003 | Detalle et al. | |
| 2003/0090671 A1 | 5/2003 | Takahashi et al. | |
| 2004/0021874 A1 | 2/2004 | Shimmick | |
| 2004/0185582 A1 | 9/2004 | Kueny | |
| 2004/0262529 A1 | 12/2004 | Yoshida et al. | |
| 2005/0003642 A1 | 1/2005 | Hecht et al. | |
| 2005/0073692 A1 | 4/2005 | De Groot | |
| 2005/0140981 A1 | 6/2005 | Waelti | |
| 2005/0237537 A1 | 10/2005 | Leizerson et al. | |
| 2005/0248771 A1 | 11/2005 | Eussen et al. | |
| 2006/0132790 A1 | 6/2006 | Gutin | |
| 2006/0194419 A1 | 8/2006 | Araki | |
| 2007/0046948 A1 | 3/2007 | Podoleanu et al. | |
| 2007/0086018 A1 | 4/2007 | Shih et al. | |
| 2007/0148792 A1 | 6/2007 | Marx et al. | |
| 2007/0188765 A1 | 8/2007 | Zhao et al. | |
| 2007/0231717 A1 | 10/2007 | Rivers et al. | |
| 2007/0258095 A1 | 11/2007 | Oliver et al. | |
| 2008/0013078 A1 | 1/2008 | Podoleanu et al. | |
| 2008/0013960 A1 | 1/2008 | Tearney et al. | |
| 2008/0151237 A1 | 6/2008 | Lian et al. | |
| 2009/0031792 A1 | 2/2009 | Fan et al. | |
| 2009/0059239 A1 | 3/2009 | Hoffmann et al. | |
| 2009/0078888 A1 | 3/2009 | Mamba et al. | |
| 2009/0128824 A1* | 5/2009 | Leitgeb | G01N 21/4795 |
| | | | 356/446 |
| 2009/0250635 A1 | 10/2009 | Sykora et al. | |
| 2009/0257065 A1 | 10/2009 | Hauger et al. | |
| 2009/0268020 A1* | 10/2009 | Buckland | A61B 3/102 |
| | | | 348/78 |
| 2009/0268209 A1* | 10/2009 | Waelti | A61B 3/102 |
| | | | 356/479 |
| 2009/0273782 A1 | 11/2009 | Yoo et al. | |
| 2010/0007894 A1 | 1/2010 | Suehira | |
| 2010/0051068 A1 | 3/2010 | Miyanari | |
| 2010/0110376 A1 | 5/2010 | Everett et al. | |
| 2010/0157308 A1 | 6/2010 | Xie | |
| 2010/0265493 A1 | 10/2010 | Jiang et al. | |
| 2010/0283842 A1 | 11/2010 | Guissin et al. | |
| 2010/0321671 A1 | 12/2010 | Marx et al. | |
| 2011/0085136 A1 | 4/2011 | Ferguson et al. | |
| 2011/0180521 A1 | 7/2011 | Quitter et al. | |
| 2011/0222070 A1 | 9/2011 | Nagai et al. | |
| 2011/0292375 A1 | 12/2011 | Marx et al. | |
| 2012/0050723 A1 | 3/2012 | Emtman et al. | |
| 2012/0200859 A1* | 8/2012 | Breitenstein | A61B 3/102 |
| | | | 356/479 |
| 2012/0238869 A1 | 9/2012 | Schmitt et al. | |
| 2012/0257207 A1 | 10/2012 | Marx et al. | |
| 2012/0257213 A1 | 10/2012 | Schonleber | |
| 2012/0320380 A1 | 12/2012 | Schonleber | |
| 2013/0034918 A1 | 2/2013 | Dusemund et al. | |
| 2013/0070732 A1 | 3/2013 | Noh et al. | |
| 2013/0120740 A1 | 5/2013 | Schonleber | |
| 2013/0162978 A1* | 6/2013 | Yazdanfar | G01B 9/02064 |
| | | | 356/51 |
| 2014/0368830 A1 | 12/2014 | Michelt | |
| 2017/0227350 A1* | 8/2017 | Sarunic | G01B 9/02004 |

FOREIGN PATENT DOCUMENTS

| | | |
|---|---|---|
| CN | 102209878 | 10/2011 |
| DE | 19525770 | 8/1996 |
| DE | 69622943 | 3/2003 |
| DE | 10319843 | 4/2004 |
| DE | 102004011189 | 9/2005 |
| DE | 102004052205 | 5/2006 |
| DE | 102005036719 | 2/2007 |
| DE | 60028709 | 5/2007 |
| DE | 102005052743 | 5/2007 |
| DE | 102006034244 | 1/2008 |
| DE | 102007048295 | 4/2009 |
| DE | 102008041062 | 4/2009 |
| DE | 102010000079 | 1/2010 |
| DE | 102008049821 | 4/2010 |
| DE | 102010016862 | 5/2010 |
| DE | 10325942 | 9/2010 |
| DE | 102010015944 | 7/2011 |
| DE | 102010016862 | 9/2011 |
| DE | 102011081596 | 4/2012 |
| DE | 102011055735 | 5/2013 |
| DE | 102012111008 | 5/2014 |
| DE | 102013008269 | 11/2014 |
| DE | 202008018535 | 7/2015 |
| EP | 0547227 | 6/1993 |
| EP | 0905476 | 3/1999 |
| EP | 1018632 | 7/2000 |
| EP | 1977850 | 10/2008 |
| EP | 2159535 | 3/2010 |
| FR | 2950441 | 3/2011 |
| GB | 1105819 | 4/2011 |
| JP | 6065963 | 4/1998 |
| KR | 1020080112436 | 12/2008 |
| TW | I279606 | 4/2007 |
| TW | 200937005 | 9/2009 |
| WO | 1997027613 | 7/1997 |
| WO | 2006028926 | 3/2006 |
| WO | 2006084279 | 8/2006 |
| WO | 2007060441 | 5/2007 |
| WO | 2008010996 | 1/2008 |
| WO | 2011086490 | 7/2011 |
| WO | 2011141867 | 11/2011 |
| WO | 2013070732 | 5/2013 |
| WO | 2014076649 | 5/2014 |

OTHER PUBLICATIONS

Lucke, et al.; Article entitled: "Mikrooptische Sensoren nach dem chromatisch konfokalen Messprinzip", Forschungszentrum Karlsruhe GmbH, Karlsruhe 2006, 23 pgs.

Machine translation for Patent No. FR2950441, accessed on Jun. 7, 2016, 12 pgs.

Micro-Epsilon USA; Brochure for Confocal Chromatic Measurement System, cited in the German Examination Report for serial No. 10 2014 008 584.8, dated Apr. 21, 2016, 11 pgs.

Micro-Epsilon; Article entitled: "New Generation of Confocal Measurement Technology", located at <http://www.microepsilon.com/press/release/PR231confocalDT/ index.html?sLang=us>, accessed on Jul. 7, 2016, 2 pgs.

(56) References Cited

OTHER PUBLICATIONS

Niklaus, et al. "Adhesive Wafer Bonding", Journal of Applied Physics, Applied Physics Reviews—Focused Review, 2006, vol. 99, No. 1, pp. 031101.1-031101.28, 29 pgs.
Precitec Optronik GMBH; French Preliminary Search Report and Written Opinion for serial No. FR1253225, dated Nov. 13, 2013, 10 pgs.
Precitec Optronik GMBH; German Examination Report for serial No. 102014008584.8, dated Apr. 21, 2016, 13 pgs.
Rowland, et al. "Impact of polymer film thickness and cavity size on polymer flow during embossing: toward process design rules for nanoimprint lithography", Journal of Micromechanics and Microengineering, 2005, vol. 15, pp. 2414-2425., 12 pgs.
Taiwan Office Action for serial No. 101121622, filed Jun. 15, 2012, dated May 21, 2014, 15 pgs.
Schoenleber; German Examination Report for serial No. DE102012102826, dated Sep. 28, 2012, 14 pgs.
Schonleber, Martin; Corrected Notice of Allowability for U.S. Appl. No. 13/440,434, filed Apr. 5, 2012, dated Mar. 1, 2016, 6 pgs.
Schonleber, Martin; Final Office Action for U.S. Appl. No. 13/440,434, filed Apr. 5, 2012, dated Feb. 10, 2014, 20 pgs.
Schonleber, Martin; Issue Notification for U.S. Appl. No. 13/440,434, filed Apr. 5, 2012, dated Mar. 9, 2016, 1 pg.
Schonleber, Martin; Non Final Office Action for U.S. Appl. No. 13/440,434, filed Apr. 5, 2012, dated Oct. 14, 2014, 16 pgs.
Schonleber, Martin; Non-Final Office Action for U.S. Appl. No. 13/440,434, filed Apr. 5, 2012, dated Jun. 25, 2015, 21 pgs.
Schonleber, Martin; Non-Final Office Action for U.S. Appl. No. 13/440,434, filed Apr. 5, 2012, dated Sep. 24, 2013, 34 pgs.
Schonleber, Martin; Notice of Allowance for U.S. Appl. No. 13/440,434, filed Apr. 5, 2012, dated Jan. 13, 2016, 11 pgs.
Schonleber, Martin; Notice of Allowance for U.S. Appl. No. 13/440,434, filed Apr. 5, 2012, dated Feb. 12, 2015, 9 pgs.
Schonleber, Martin; Notice of Allowance for U.S. Appl. No. 13/440,434, filed Apr. 5, 2012, dated Sep. 23, 2015, 11 pgs.
Schonleber; United Kingdom Search Report for serial No. GB11058195, filed Apr. 6, 2011, dated Jul. 23, 2012, 4 pgs.
Dusemund, Claus; Issue Notification for U.S. Appl. No. 13/521,736, filed Jul. 11, 2012, dated Apr. 16, 2014, 1 pg.
Dusemund, Claus; Non-Final Office Action for U.S. Appl. No. 13/521,736, filed Jul. 11, 2012, dated Jul. 23, 2013, 18 pgs.
Dusemund, Claus; Notice of Allowance for U.S. Appl. No. 13/521,736, filed Jul. 11, 2012, dated Dec. 27, 2013, 8 pgs.
Dusemund; International Preliminary Report on Patentability for serial No. PCT/IB2011/050091, filed Jan. 10, 2011, dated Aug. 16, 2012, 14 pgs.
Dusemund; International Search Report and Written Opinion for serial No. PCT/IB2011/050091, filed Jan. 10, 2011, dated Apr. 12, 2011, 3 pgs.
Huang et al.; "Optical coherence tomography", Science, vol. 254, No. 5035, S. 1178-1181 (Nov. 22, 1991), 4 pgs.
Vakhtin et al.; "Common-path interferometer for frequency-domain optical coherence tomography"; Applied Optics, vol. 42, No. 34, S. 6953-6957 (Dec. 1, 2003), 6 pgs.
Extended European Search Report for serial No. EP12172165, dated Oct. 24, 2012, 5 pgs.
Precitec Optronik GMBH; Korean Notice of Preliminary Rejection for serial No. 10-2012-0064923, filed Jun. 18, 2012, dated Oct. 30, 2014, 11 pgs.
Schonleber, Martin; Applicant Interview Summary for U.S. Appl. No. 13/525,184, filed Jun. 15, 2012, dated Oct. 27, 2015, 3 pgs.
Schonleber, Martin; Final Office Action for U.S. Appl. No. 13/525,184, filed Jun. 15, 2012, dated Oct. 7, 2014, 17 pgs.
Schonleber, Martin; Final Office Action for U.S. Appl. No. 13/525,184, filed Jun. 15, 2012, dated Jul. 28, 2015, 32 pgs.
Schonleber, Martin; Issue Notification for U.S. Appl. No. 13/525,184, filed Jun. 15, 2012, dated Oct. 26, 2016, 1 pg.
Schonleber, Martin; Non-Final Office Action for U.S. Appl. No. 13/525,184, filed Jun. 15, 2012, dated Feb. 25, 2014, 16 pgs.
Schonleber, Martin; Non-Final Office Action for U.S. Appl. No. 13/525,184, filed Jun. 15, 2012, dated Dec. 31, 2015, 21 pgs.
Schonleber, Martin; Non-Final Office Action for U.S. Appl. No. 13/525,184, filed Jun. 15, 2012, dated Feb. 19, 2015, 21 pgs.
Schonleber, Martin; Notice of Allowance for U.S. Appl. No. 13/525,184, filed Jun. 15, 2012, dated Jul. 12, 2016, 21 pgs.
Schonleber; German Examination Report for serial No. DE102011051146, filed Oct. 4, 2012, dated Jan. 19, 2012, 6 pgs.
Schonleber, Martin; Final Office Action for U.S. Appl. No. 13/667,809, filed Nov. 2, 2012, dated Sep. 16, 2013, 9 pgs.
Schonleber, Martin; Issue Notification for U.S. Appl. No. 13/667,809, filed Nov. 2, 2012, dated Feb. 25, 2015, 1 pg.
Schonleber, Martin; Non-Final Office Action for U.S. Appl. No. 13/667,809, filed Nov. 2, 2012, dated Apr. 15, 2013; 12 pgs.
Schonleber, Martin; Non-Final Office Action for U.S. Appl. No. 13/667,809, filed Nov. 2, 2012, dated Apr. 24, 2014; 8 pgs.
Schonleber, Martin; Notice of Allowance for U.S. Appl. No. 13/667,809, filed Nov. 2, 2012, dated Dec. 4, 2014, 10 pgs.
Schonleber; International Preliminary Report on Patentability for serial No. PCT/IB2011/052048 filed May 10, 2011, dated Nov. 22, 2012, 7 pgs.
Schonleber; International Search Report and Written Opinion for serial No. PCT/IB2011/052048 filed May 10, 2011, dated Sep. 21, 2011, 2 pgs.
Michelt, Berthold; Applicant Initiated Interview Summary for U.S. Appl. No. 14/307,481, filed Jun. 17, 2014, dated Jul. 1, 2016, 3 pgs.
Michelt, Berthold; Applicant Interview Summary for U.S. Appl. No. 14/307,481, filed Jun. 17, 2014, dated Nov. 20, 2015, 3 pgs.
Michelt, Berthold; Final Office Action for U.S. Appl. No. 14/307,481, filed Jun. 17, 2014, dated Feb. 12, 2016, 24 pgs.
Michelt, Berthold; Issue Notification for U.S. Appl. No. 14/307,481, filed Jun. 17, 2014, dated Nov. 2, 2016, 1 pg.
Michelt, Berthold; Non-Final Office Action for U.S. Appl. No. 14/307,481, filed Jun. 17, 2014, dated Aug. 26, 2015, 41 pgs.
Michelt, Berthold; Notice of Allowance for U.S. Appl. No. 14/307,481, filed Jun. 17, 2014, dated Jul. 25, 2016, 20 pgs.
Precitec Optronic GMBH; International Search Report and Written Opinion for serial No. PCT/IB2014/062290, filed Jun. 17, 2014, dated Sep. 22, 2014, 20 pgs.
Chinese Office Action for serial No. 201380059958.1, filed Nov. 14, 2013, dated Oct. 9, 2016, 11 pgs.
German Examination Report for serial No. 102012111008.5, filed Nov. 15, 2012 , dated Jun. 19, 2013, 17 pgs.
Schonleber, Martin; International Search Report and Written Opinion for PCT/IB2013/060127, filed Nov. 14, 2013, dated Mar. 21, 2014, 27 pgs.
Schonleber, Martin; Non-Final Office Action for U.S. Appl. No. 14/713,150, filed May 15, 2015, dated Sep. 6, 2016; 50 pgs.
German Examination Report for German Application No. DE102013010030.5, filed Jun. 17, 2013, dated Feb. 28, 2014, 12 pgs.
Jakob, Dr. G., "Koaxiale Interferometrische Schichtdickenmessung", Optical Measuring, Sonderdruck aus Photonik Mar. 2000; 4 pgs.
ISIS Sentronics Gmbh Data Sheet, "StraDex a3 sensor" and "StraDex f2-80 sensor head", publicly available prior to Oct. 11, 2012, 3 pgs.
Malta, D. et al.; "Fabrication of TSV-Based Silicon Interposers", RTI International, publicly available prior to Oct. 11, 2012, 6 pgs.
Dietz, Christoph; German Examination Report for serial No. 10 2017 126 310.1, filed Nov. 9, 2017, dated Jul. 18, 2018, 14 pgs.

\* cited by examiner

DISTANCE MEASURING DEVICE AND METHOD FOR MEASURING DISTANCES

CROSS-REFERENCE TO RELATED APPLICATION

This application claims the benefit of German Patent Application No. DE 10 2016 124 009.5, filed on Dec. 12, 2016, which is hereby specifically incorporated by reference herein in its entirety.

TECHNICAL FIELD

The invention relates to a device and a method for optically measuring distances.

BACKGROUND

In the prior art, optical methods, in particular methods based on optical coherence tomography (OCT, Optical Coherence Tomography) or OCT measuring methods for measuring distances are known. Optical distance measurements are required for, for example, topographic analyses of workpieces or other objects to be measured.

The publication DE 102013008269 A1 describes a machining head and a machining method for laser machining of a workpiece using laser radiation, wherein the distance to the workpiece is determined using an optical coherence tomograph with a trackable reference arm with beam folding.

In order to analyze a topography or a geometrical property of an object to be measured using the OCT method, the OCT light or measuring light or the measuring light beam is directed to different measuring points of the surface to be analyzed, which may lead to problems with the measurement technology particularly in the case of a pronounced topography or a heavily stepped objected to be measured, in particular when the measuring range of the sensor is smaller or very much smaller than the height variation of the object to be measured.

SUMMARY

It is an object of the present invention to provide a device and a method for a reliable and precise measurement of distances which may also be used for heavily stepped objects to be measured.

In order to achieve said object, a distance measuring device for measuring a distance to an object to be measured by an optical coherence tomograph or an OCT sensor is provided, comprising a beam splitter for splitting broadband coherent light emitted by a light source in measuring light which is guided through an object arm or a measuring arm to the object to be measured and in reference light which is guided to a reference arm with a folded beam path. The beam splitter may in particular be configured as a beam splitter cube.

The reference arm may in particular comprise a folded beam path or a folded light way which the reference light has to overcome several times until it can exit the reference arm. The folded light way or the light way with the folded beam path may in particular comprise an N-fold folding or a folding with a folding number N.

The optical coherence tomograph is configured such that the distance to the object to be measured or the measuring distance may be determined by an interference between the reference light which has traveled the reference distance of the reference arm and the measuring light reflected back by the object to be measured. The distance to be measured or the measuring distance is measured between a measuring point and a fixed reference point at the distance measuring device.

The optical coherence tomograph may in particular be configured as an optical coherence tomograph based on a frequency domain optical coherence tomography (FD-OCT) which comprises a characteristic dynamical range or measuring range or measuring depth.

The broadband coherent light source may be selected from the group consisting of a light emitting diode, a semiconductor superluminescent diode, an ASE source (optically pumped fiber based amplified spontaneous emission source), an optically pumped photonic crystal laser and a tunable semiconductor quantum dot laser.

Said light sources are particularly suitable as light sources in the near-infrared and in the visible spectral range.

A focusing optics with a focus which is movable along an optical axis of the object arm is provided in the object arm. The focusing optics comprises a movable optical element and is configured such that a movement of the movable optical element along the optical axis causes a movement of the focus of the focusing optics along the optical axis, in particular a movement which is many times higher. In particular, the movement of the optical element may cause a movement of the focal point which is two times to 20 times higher. The focusing optics thus acts as a beam expander which is capable of setting the focus of the focusing optics according to the surface topography of the object to be measured also in case of a highly pronounced relief or a heavily stepped object to be measured, for example at step heights up to 10 cm or even higher.

The movable optical element is coupled to the reference arm such that the optical path length of the reference arm can be tracked synchronously with and dependent on the movement of the focus.

The movable optical element may in particular be configured as a lens which is movable along the optical axis and the focusing optics may further comprise an immovable lens, in particular a collimating lens, downstream the movable lens.

The focusing optics may in particular be configured as a two-lens beam expander. The movable lens may be configured as a movable diverging lens and the immovable lens or the collimating lens may be configured as a converging lens.

The two-lens beam expander allows for realizing the focusing optics with adjustable focus in a simple manner, wherein a non-linearity of the transmission ratio and a change of the numerical aperture may be accepted in some applications due to the simplicity of such a focusing system, especially since the two-lens beam expander offers sufficient linearity of the transmission ratio to always keep the measured path difference within the measuring range of the OCT sensor when measuring a focused workpiece.

The focusing optics may comprise a predefined numerical aperture NA and may be configured such that the numerical aperture of the focusing optics remains substantially constant during the movement of the focus of the focusing optics by the movement of the movable optical element along the optical axis.

The focusing optics may comprise a predefined measuring spot size and may be configured such that the measuring spot size remains substantially constant during the movement of the focus of the focusing optics by the movement of the movable optical element along the optical axis.

By retaining the numerical aperture during the movement of the focus or the focal point, the measuring spot size at the focal point at different positions of the focal point will remain substantially constant, whereby the measurement precision can be increased.

The focusing optics may be configured as a three-lens beam expander.

In particular, the movable optical element may be configured as a converging lens which is movable along the optical axis and the focusing optics may further comprise an immovable diverging lens and an immovable converging lens or collimating lens and may be configured such that, in paraxial approximation, a movement z of the movable lens along the optical axis causes a movement $z'=F*z$ of the focal point which is proportional to said movement.

In particular, the movable lens with a focal length $f_1$ and the immovable lenses with according focal lengths $f_2$ and $f_3$ may be positioned such that, in paraxial approximation or in small angle approximation $z'=F*z$ is valid, wherein the proportionality factor F is determined by the choice of $f_1$, $f_2$ and $f_3$, the distance $z_2$ between the two immovable lenses and the distance $z_0$ between the movable lens and the immovable lens in the starting position.

In particular, the lenses L1, L2 and L3 may be chosen such that $f_3>f_2>|f_1|$ and may be positioned such that the beam guidance corresponds to a Kepler beam guidance or a beam guidance in a Kepler telescope.

By choosing the Kepler beam guidance for the three-lens beam expander, the distance between the lenses L1 and L2 can be enlarged, so that further optical components can be placed between these two lenses.

In an embodiment, a pivotable double mirror with a retroreflector is provided in the beam path of the focusing optics. In particular, the double mirror may be configured as an electrically driven galvo mirror.

By changing the rotary position of the double mirror, the optical path length of the light beam in the double mirror can be changed easily, so that the focal point of the measuring light beam can be moved in a simple manner.

The focusing optics may comprise the Kepler beam guidance and may be configured such that the beam path between the lenses L1 and L2 runs via the double mirror with the retroreflector. In an exemplary embodiment, the focal lengths f2 and f3 will be substantially the same.

By rotating the double mirror, the focal point of the focusing optics can be moved without involving a tracking of the reference arm. This may be used for example during a running-in of the distance measuring device.

The focusing optics may be configured such that the numerical aperture of the focusing optics can take different predefined values.

In particular, the collimating lens of the focusing optics may be configured as an exchangeable collimating lens.

Moreover, a pivotable revolver holder may be provided for the collimating lens which can receive different lenses, wherein each lens can be spatially positioned exactly in the beam path of the focusing optics depending on the desired NA.

With this three-lens system, focusing the measuring light or adapting the focal point of the surface of the object to be measured can be carried out in a simple manner. Moreover, the proportionality factor F or the transmission ratio of the focusing optics or the beam expander can be freely adjusted by the choice of the parameters of the three-lens system.

The focusing optics may be configured such that the focal lengths $f_1$, $f_2$, $f_3$ of the three lenses fulfill the relationship $f_3>f_1>|f_2|$.

By fulfilling the relationship $f_3>f_1>|f_2|$, the last step of the beam expander or the distance between the third lens and the measurement point, respectively, becomes large enough so that for example a scanning device for scanning the surface of the object to be measured can be placed there.

In an exemplary embodiment, the three-lens beam expander comprises a movable diverging lens L1 with a focal length $f_1$ and two immovable converging lenses L2 and L3 with according focal lengths $f_2$ and $f_3$. In particular, the lenses may be chosen such that $f_3>f_2>|f_1|$ and may be positioned such that the beam guidance resembles the beam guidance in a Galilei telescope. Such a focusing optics comprises a more compact design in comparison to the focusing optics with a Kepler beam guidance.

The distance measuring device may comprise a compensating lens with a weak negative refraction power which is connected upstream of the focusing optics, in particular upstream of the first movable lens of the focusing optics.

The compensating lens connected upstream of the focusing optics can contribute to the enhancement of the focusing quality by compensating non-ideality of the focusing optics.

At one end of the folded light way, the reference arm may comprise an optical path delimiter being movable in correlation with the movable optical element for limiting or setting the optical path length of the reference arm. The correlated movement of the optical element and the path delimiter may in particular be carried out via a lever.

By moving the optical path delimiter in the reference arm in correlation with the optical element of the measuring arm, the optical path length of the reference arm can be tracked synchronously with the movement of the focus in a simple manner.

The folded light way may be provided by two path delimiters, wherein the two path delimiters are configured as prismatic optical elements and wherein one of the two prismatic optical elements is pivotable around an axis which is parallel to the folded light way, such that the folding number N of the folded light way is adjustable by rotating the pivotable prismatic optical element.

By rotating the pivotable prismatic optical element, the folding number N can thus be varied in a simple manner.

In an embodiment, the folded light way is configured such that the light enters the folded light way along the axis of rotation of the pivotable prismatic optical element.

The coincidence of the axis of rotation with the light beam of the light entering the light way allows for easily adjusting the folded light way.

A twin of the folded light way may be provided in the object arm. In particular, the twin of the folded light way may be configured as a light way with a constant optical path length and may comprise a structure which is, apart from that, identical to the folded light way.

By providing the twin of the folded light way in the object arm, in particular light ways in the path delimiters or in the prismatic optical elements which do not change when changing the length of the folded light way can be compensated.

The path delimiter and the movable optical element may be configured such that they can perform a translatory motion together or simultaneously and the focusing optics can be dimensioned such that the proportionality factor F of the focusing optics and the folding number N of the folded light way are equal. In particular, the optical path delimiter and the optical element may be movable on a common slide along an adjusting axis which is parallel to the optical axis of the focusing optics and to the folded light way.

By providing a simultaneous translatory motion of the optical path delimiter and the optical element, the movement s of the path delimiter and the movement z of the optical element are equal, s=z. The movement of the focal point F*z and the change N*s of the optical path length of the reference arm at F=N thus become equal as well, so that the change of the optical path length of the measuring arm during the movement of the focus is compensated for in an easy manner by a simultaneous change of the optical path length of the reference arm. In that way it is ensured for each position z of the beam expander that the OCT distance measuring value, i.e. the optical path difference dz between the object arm and the reference arm, remains close to dz=0 for an object to be measured arranged in the focus of the object beam and does not exceed the measuring range during the movement.

The optical path delimiter may be configured as a movable reflective optical element which together with another immovable reflective optical element forms the folded light way. The reflective optical elements may be configured as a mirror or an end mirror or as a prismatic optical element. In particular, the path delimiter or the reflective element opposite the path delimiter, respectively, may be configured as a retroreflector or a cat's eye reflector which comprises at least two reflective surfaces oriented towards each other at 90°.

By positioning the two reflective elements accordingly, the folded light way can be adjusted easily or the folding number N of the light way can be adjusted in a simple manner.

The distance measuring device may comprise an encoder for outputting a current position z of the movable optical element. The position z is considered to be the position along a positive Z-axis oriented along the optical axis of the focusing optics in illumination direction. The encoder may in particular be arranged on the adjusting axis or the rail.

On the basis of the current z position output by the encoder, the absolute arm's length or optical path length of the reference arm can be determined by the relation $z_{reference}=N*z+z_R$ (with the offset $z_R$), whereby the absolute distance value $Z_{object}$ of the current measuring point can be determined by the relation $z_{object}=dz+z_{reference}$.

In an embodiment, the current arm's length of the reference arm can be determined using a calibration table with stored dependency $z_{reference}(z)$. Said table can be determined during a test run with different z and different distances $z_{object}$ of the object to be measured.

By a calibration using the calibration table, a measurement relationship is possible using the wavelength of monochrome measuring light, in particular by counting the interference maxima during the movement which is measured using the encoder.

The distance measuring device may further comprise an additional reference arm or a calibration branch with a reference plate with position indicators for calibration verification of the distance measuring device. The position indicators are configured as reflective indicators which are arranged at preset positions $Z_{object}=z_{reference\ plate}(i)$ along a surface of the reference plate.

By matching the results of the distance measurements with the results of the measurements performed using the light reflected by the position indicators of the reference plate, the calibration of the distance measuring device can be verified in real time, so that the measurement precision can be increased.

The position indicators may be configured as glass beads with a refractive index n of about 1.950 to 2.000, in particular of about n=1.982.

The collimated or parallel light rays entering the glass beads are focused on the back wall of the glass beads so that they can be reflected back on the inverse path. For increasing the reflectivity of the glass bead, the back wall of the glass bead can be provided with a reflective coating.

The glass beads may comprise a diameter of about 15 μm to about 300 μm, in particular of about 20 μm to about 100 μm.

A reference plate with such glass beads can be manufactured with high manufacturing precision.

Instead of glass beads, the position indicators may be configured as corner cube retroreflector mirrors. Such corner cube retroreflector mirrors as well as the glass beads comprise a high alignment tolerance and high reflectivity.

The reference plate may comprise a material with a thermal expansion coefficient below 0.5 ppm/K. For example, the reference plate may comprise quartz glass or glass ceramics on a Li2O/Al2O3/nSiO2 basis or a Fe(64%)/Ni(36%) alloy. Said materials provide for the thermal stability of the position of position indicators.

The reference plate may also be configured as a stair body with steps of approximately 20 μm height. The width of the steps should be smaller than the measuring range or the measuring depth of the OCT sensor.

The reference plate may be provided in the object arm. To this end, a part of the object beam is diverted and guided along the surface of the reference plate which comprises the reflective position indicators.

The path difference dz(i) to some of these position indicators may be determined during the OCT measurement mode, so that $z_{object}=z_{reference\ plate}(i)+dz-dz(i)$ is determined in an absolute way and a real time calibration using the reference plate can be performed in this way.

The distance measuring device may comprise a calibration branch of the reference arm with two parallel reflector plates which form an air gap, wherein the size of the air gap is determined by the regulating position z: d(z)=d0+z. In particular, one of the two parallel reflector plates may be movable together with the optical element.

The distance measuring device may be configured such that a part of the light of the object arm can be diverted and can be directed to the reference arm. In particular, a peripheral part of the light of the reference arm may be diverted so that the functionality of the distance measuring device is not influenced or is at least not substantially influenced by diverting part of the light.

The distance measuring device may further be configured such that the calibration arm may be blocked or may be uncoupled from the main optical path of the distance measuring device. In particular, the calibration branch may be cut by adjusting an adjusting mirror.

By blocking the additional reference arm or the calibration arm, check measurements can be performed without the additional reference arm, wherein the check measurements are not disturbed by the presence of the reference peak.

The distance measuring device may comprise a scanning device, in particular a mirror scanner for scanning a measuring range of the surface of the object to be measured. The scanning device may in particular be arranged in the beam path of the distance measuring device between the focusing optics and the object to be measured.

The mirror scanner of the scanning device may comprise at least one mirror which is rotatable in at least one direction, in particular an electrically controllable galvo mirror.

Using the mirror scanner, the measuring light beam can be deviated in at least one direction for scanning the surface of the object to be measured.

The scanning device may be configured as a two dimensional scanner so that the measuring light can be deflected or swiveled in two directions, in particular in two orthogonal directions.

The scanning device may comprise at least one deflecting mirror for capturing at least a part of the measuring light and for scanning at least one dedicated portion of the surface of the object to be measured.

The at least one deflecting mirror may be configured such that a maximum deflection or maximum deviation of the measuring beam from a central direction during scanning the portion of the surface of the object be measured is +/−20°, in particular 10°.

By limiting the maximum deflection angle, the defocusing of the measuring beam caused by the beam deflection can be limited. By limiting the defocusing, the measuring inaccuracy caused by the defocusing of the measuring beam can thus be reduced.

By providing the at least one deflecting mirror, also heavily stepped objects to be measured or objects to be measured with a complex topography can be measured by the OCT sensor.

The distance measuring device may comprise an imaging system in the object arm, whereby the measuring light can be guided to the object to be measured.

Using the imaging system, the measuring light beam can be specifically formed for OCT capturing of the surface of the object to be measured.

The at least one deflecting mirror may be configured as part of the imaging system.

In particular, the imaging system may comprise a reflection optics and the at least one deflecting mirror may be configured as a concave and/or a convex reflection optics element of the reflection optics of the imaging system.

Thus, the deflecting mirror can be used both for beam forming and for scanning a dedicated portion of the surface of the object to be measured, whereby the distance measuring device can be simplified.

The imaging system may in particular be configured as a magnifying microscope objective.

Using the imaging system, the object to be measured can be scanned locally and with high resolution, for example by placing a magnifying microscope objective in front of it and by radiating with the scanner through the microscope objective on the object to be measured. The imaging system allows for achieving a high scanning precision and a high NA or a high lateral resolution.

An interference objective or a Mirau interferometer may be provided as magnifying microscope objective.

In the Mirau interferometer, interferences of the broadband coherent light occur in a reference plane of the objective, whereby information about the surface properties of the object to be measured can be gathered. Moreover, the interference objective can be adjusted precisely for the OCT measurement using interference peaks.

Moreover, a method for measuring distances is provided, comprising:
  providing a distance measuring device, comprising a beam splitter for splitting broadband coherent light emitted by a light source in measuring light which is guided through an object arm to an object to be measured and in reference light which is guided to a reference arm with a folded beam path, wherein a focusing optics with a focal point which is movable along an optical axis of the object arm is provided in the object arm, the focusing optics being configured as a beam expander,
  positioning the object to be measured in a measuring position,
  focusing the measuring light at a measuring point of the surface of the object to be measured by moving the focal point of the focusing optics to the measuring point,
  measuring the distance to the measuring point using an OCT method,
  focusing the measuring light at a second measuring point of the surface of the object to be measured while simultaneously compensating for the path difference in the reference arm caused by the movement of the focal point;

In particular, the method may be performed repeatedly at different positionings of the object to be measured, so that the topography of the object be measured can be determined.

Focusing the measuring light may comprise passing through a focus range along the optical axis with the focal point, wherein a position of the focal point with the strongest OCT distance signal is used for measuring the distance.

By using the position of the focal point in the focus range with the strongest OCT distance signal, a kind of autofocus function for fine focusing is realized, which may lead to an increase in the sensitivity and the precision of the measurement.

The method may further comprise:
  measuring the distance to a first measuring point of the surface of the object to be measured in a first measuring position of the object to be measured,
  moving the object to be measured to a second measuring position,
  measuring the distance to a second measuring point of the surface of the object to be measured in the second measuring position of the object to be measured, wherein moving the object to be measured to the second measuring position comprises a translatory motion of the object to be measured.

The translatory motion or the linear motion of the object to be measured in between two measurements allows for performing profile measurements of the object to be measured.

The method may comprise scanning a measuring range of the object to be measured with a scanning device.

By scanning a scanning range, the scanned measuring range of the object to be measured can be topographically analyzed in a simple manner.

The method may comprise approaching predetermined check measuring positions with the focal point and measuring the distances at the check measuring positions.

Check measurements may be performed at the check measuring positions or the check positions in order to ensure an accurate procedure. Moreover, the check measurements at the check measuring positions can help in identifying faulty measurements in order to filter these measurements out of the measurement results.

The scanning device may comprise at least one deflecting mirror for capturing at least a part of the measuring light, wherein the method further comprises scanning at least one dedicated portion of the surface of the object to be measured. In particular, scanning the dedicated portion of the surface of the object to be measured may be performed using the light deflected by the at least one deflecting mirror.

By providing the at least one deflecting mirror, also heavily stepped objects to be measured or objects to be measured with a topography which is difficult to access can be measured by the OCT measuring method.

In the method, a current position of the focal point can be determined as a function of a current position of the deflecting mirror using a calibration table.

In particular, the calibration table may provide a correlation between the position of the focal point, for example in Cartesian coordinates x,y,z, and one or more scanning angles and an hypothetical Z-position of the focal point, i.e. a Z-position which the focal point would take in the absence of the deflecting mirror.

Such calibration table allows for determining the current position of the focal point or the OCT spot in an easy manner.

In order to take into account OCT beams which are reflected at the deflecting mirror, coordinates x',y',z' of the reflected focal point may be calculated from the coordinates x,y,z of the focal point determined using the calibration table.

The reflected coordinates x',y',z' may be determined for example by the positioning parameters or the CAD position (computer aided design position), respectively, of the deflecting mirror and based on an original calibration table. The CAD position parameters of the deflecting mirror may comprise for example base point or reference point, orientation and boundary of the deflecting mirror.

The reflected coordinates x',y',z' may be determined using a second calibration table which is determined during a calibration run or by measuring a calibration body, respectively.

This method for determining the reflected coordinates x',y',z' is particularly suitable in such cases, where several measurements are performed with the same configuration of the deflecting mirror, for example when measuring several objects to be measured of similar type.

Moreover, the reflected coordinates of the focal point may be determined by an indirect measurement of the position of the deflecting mirror by measuring in the measuring field at positions with defined absolute position x',y',z' at least three measuring points, for example provided as reflective beads. By matching the measured x,y,z value and the CAD value of x',y',z', the reflecting plane is determined, whereby the lock-in range or scanning range, respectively, of the reflected measuring field provided in input coordinates can be determined.

The reflected coordinates x',y',z' of the focal point may be determined by a direct measurement of the position of the mirror, for example by scanning a chamfer at the edge of the mirror or a lock-in range, respectively, and of at least three miniature diffusers on the mirror.

The direct measurement of the position of the mirror allows for precisely determining the reflected coordinates of the focal point. Moreover, knowledge of the positions of the three miniature diffusers is not required if the base point or reference point and the orientation of the deflecting mirror are known.

The at least one deflecting mirror may comprise a reflecting surface applied to the object to be measured.

By applying the at least one reflecting surface to the object to be measured, a kind of "cooperative object to be measured" may be provided which facilitates an OCT measurement in particular of positions of the object to be measured which are difficult to access.

The object to be measured may comprise a material being at least partially transparent for the OCT light and the method may comprise measuring the distance to a surface measuring point in transmission mode. In particular, the at least partially transparent material may comprise a known thickness.

The transmission mode allows for topographically capturing a backside facing away from an incidence side of the OCT light or positions of the object to be measured which are difficult to access for direct lighting.

The distance measuring device may comprise an imaging system in the object arm and the measuring light may be guided via the imaging system to the object to be measured during the distance measurement. The imaging system may in particular be configured as a magnifying microscope objective.

Using the imaging system, the object to be measured can be scanned locally and with high resolution, for example by placing a magnifying microscope objective in front of it and by radiating with the scanner through the microscope objective on the object to be measured.

The imaging system allows for achieving a high scanning precision and a high NA or a high spatial or lateral resolution.

An interference objective or a Mirau interferometer may be provided as magnifying microscope objective.

In the Mirau interferometer, interferences of the broadband coherent light occur in a reference plane of the objective, whereby information about the surface properties of the object to be measured can be gathered. Moreover, the interference objective can be adjusted precisely with respect to the object to be measured for the OCT measurement using the interference peaks.

BRIEF DESCRIPTION OF THE DRAWINGS

The embodiments will be explained in more detail in the following with reference to the drawings, wherein the same parts or parts with equal functions are denoted with the same reference numerals.

DETAILED DESCRIPTION

Figure 1:
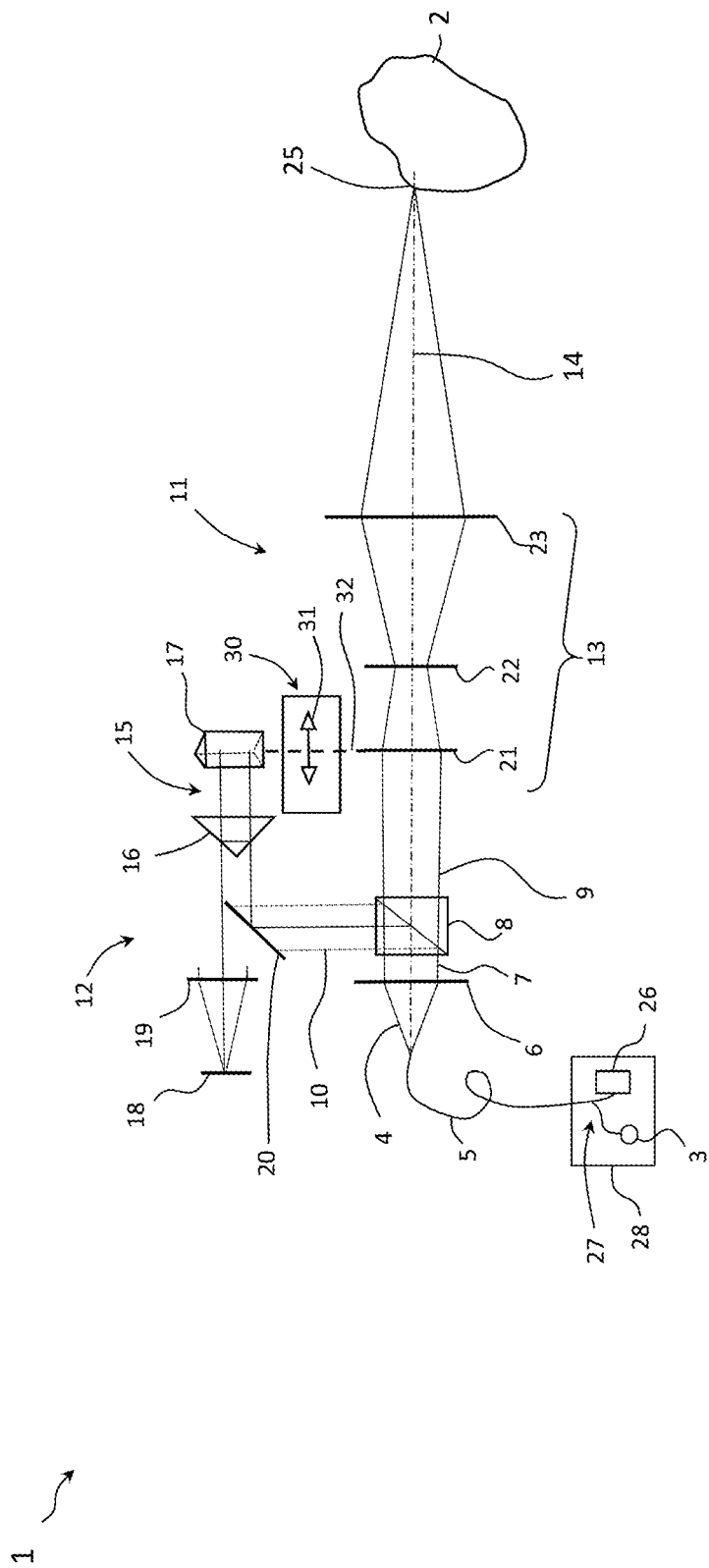
FIG. 1 shows a schematic configuration of a distance measuring device according to an embodiment.

FIG. 1 shows a schematic configuration of a distance measuring device according to an embodiment.

The distance measuring device 1 for measuring a distance to an object to be measured 2 comprises a light source 3 for generating broadband coherent light 4 which is guided from the light source 3 via an optical fiber 5 to a collimator 6 for forming a collimated light beam 7.

The distance measuring device 1 further comprises a beam splitter 8 for splitting the collimated light beam 7 in a measuring light beam 9 and in a reference light beam 10. The measuring light beam 9 is guided via a measuring arm or an object arm 11 to the object to be measured 2. The reference light beam 10 is guided to a reference arm 12.

A focusing optics 13 with an optical axis 14 for focusing the measuring light beam 9 on the surface of the object to be measured is provided in the object arm 11.

The reference arm 12 comprises a folded light way 15 and an end mirror 18 with an upstream focusing optics 19. The folded light way is defined by two path delimiters 16 and 17 which are configured as an immovable retroreflector and a movable retroreflector.

The retroreflectors or path delimiters 16 and 17 are arranged such that the folded light way 15 is substantially parallel to the optical axis 14 of the focusing optics 13. The reference light beam 10 is directed to the folded light way 15 of the reference arm 12 by an adjusting mirror 20.

The path delimiters 16 and 17 are configured as prismatic optical elements which each comprise a pair of reflective plane surfaces which are arranged at an angle of 90° towards each other and by 45° with respect to the longitudinal direction of the light way 15, wherein the prismatic optical elements are orientated azimuthally differently with respect to the longitudinal direction of the light way 15. In this context, an azimuthally different orientation of the prismatic optical elements means that the projections of the two 90° edges of the two prismatic optical elements on a plane perpendicular to the longitudinal axis of the reference light way 15 cross at an azimuth angle different from zero. In this exemplary embodiment, the azimuth angle is 90°.

The light may pass through the light way 15 between the path delimiters 16 and 17 several times before it may exit the light way 15. The azimuth angle can take different discrete values depending on the folding number N. For example, the folding number N of the light way 15 can take values of 4, 6, 8, and 12, respectively, at an azimuth angle of 90°, 60°, 45°, and 30°, respectively.

By folding the light way 15, the light way can thus be accordingly compressed twofold, fourfold, sixfold, eightfold and twelvefold, respectively, or even manifold, thereby allowing for a compact design of the distance measuring device 1. At the twofold folding, when N=2, the retroreflector 16 is omitted.

In an embodiment, one of the two prismatic optical elements is pivotable around an axis which is parallel to the optical axis of the folded light way, such that the folding number N is adjustable by rotating the pivotable prismatic optical element.

By rotating the pivotable prismatic optical element, the folding number N can thus be varied in a simple manner.

In an embodiment, the light way 15 is configured such that the light enters the folded light way 15 along the axis of rotation of the pivotable prismatic optical element.

By rotating the pivotable prismatic optical element around the entering light beam, the folded light way 15 can be adjusted in a simple manner.

In order that the transmission ratio F of the focus fits to the adapted folding number N of the reference arm, the focal length of the focusing system has to be adapted as well. In the simplest way, this is achieved by changing lens 23, wherein also the distance between L2 and L3 as well as the absolute position of the focus range changes.

The focusing optics 13 comprises three lenses L1, L2 and L3 with reference numerals 21, 22 and 23 which are arranged at different positions along an optical axis 14.

The first lens 21 which is arranged in the object arm 8 directly after the beam splitter 4 is a movable lens. In particular, the position of the lens 21 along the optical axis 14 or the z position with a z-axis directed in illumination direction or towards the object to be measured is changeable. The second and the third lenses 22 and 23 each comprise a predetermined fixed z position.

The three lenses 21, 22 and 23 are dimensioned such that the focusing optics 13 acts like a beam expander with a focal point 25 or a focus being movable along the optical axis 14 and with a transmission ratio F of the focus or a transmission ratio or a transmission factor. The transmission ratio F of the focus provides a relationship between a movement z of the first lens 21 along the optical axis 14 of the focusing optics 13 and the movement z' of the focal point 25: $z'=F*z$.

The distance measuring device 1 further comprises a spectrometer 26 which is coupled to the optical fiber 5 by a Y-coupler 27. The spectrometer 26, the light source 3 and the Y-coupler 27 are arranged within a housing 28.

The spectrometer 26 is configured such that the distance to the object to be measured 3 can be determined spectroscopically by an interference between the reference light beam 10 which has traveled the light way 15 of the reference arm 12 and the measuring light beam 9 reflected back by the object to be measured 3.

The distance measuring device 1 further comprises a movable slide 30 which can be moved back and forth parallel to the optical axis 14 of the object arm 11 along an adjusting axis or a rail (not shown). The directions of movement of the slide 30 are illustrated in FIG. 1 by a double-sided arrow 31. The lens 21 and the retroreflector 17 are mechanically coupled to the slide 30 such that they can also be moved together with the slide 30 parallel to the optical axis 14 of the object arm 11 so that a movement z of the slide 30 along the optical axis 14 causes an equally high movement of both the retroreflector 17 and the lens 21. The mechanical coupling of the retroreflector 17 and the lens 21 to the slide 30 is illustrated by a dashed line 32. As already explained above with regard to the N-fold folded light way 15, the optical path length of the reference arm is enlarged by N*z during a positive movement z of the retroreflector 17, wherein the focal point 25 of the focusing optics 13 moves by F*z. The movement of the focal point 25 or the focus of the focusing optics 13 by F*z causes a change of the optical path length of the measuring beam by 2*F*z.

The transmission ratio F of the focus of the focusing optics 10 and the folding number N of the light way 15 can be chosen such that the change of the optical path length of the measuring light beam 9 caused by the movement of the focal point 25 can be compensated for by an according change of the length of the light way 15. This condition is fulfilled, when F=N. An eightfold folding of the light way 15 would result in a transmission ratio of the focusing optics of 8.

Said arrangement of the distance measuring device 1 allows for a precise distance measurement also for highly profiled objects to be measured with topographical height differences of more than 100 mm. This is because the optical path length of the reference arm can be tracked synchronously and precisely according to the movement of the focal point 25 also for higher movements of the focal point 25 so that the distance measuring device 1 does not exit the dynamic range. In particular, tracking the reference arm ascertains that, for each position z of the beam expander, the OCT distance measuring value, i.e. the optical path difference dz between the object arm and the reference arm, remains close to $dz = z_{focus}$ for an object to be measured at the focus of the object beam and does not exceed the measuring range during the movement.

The absolute distance value of the object to be measured is given by the following relation:

$$Z_{object} = dz + z_{reference}(z)$$

dz is the path difference relative to a reference point being movable together with the focal point 25, whereas $Z_{reference}(z)$ denotes the absolute position of the reference point.

By knowing the absolute position of the focal point 25, the absolute distance value can thus be determined for each scanned spot of the surface of the object to be measured.

Figure 2:
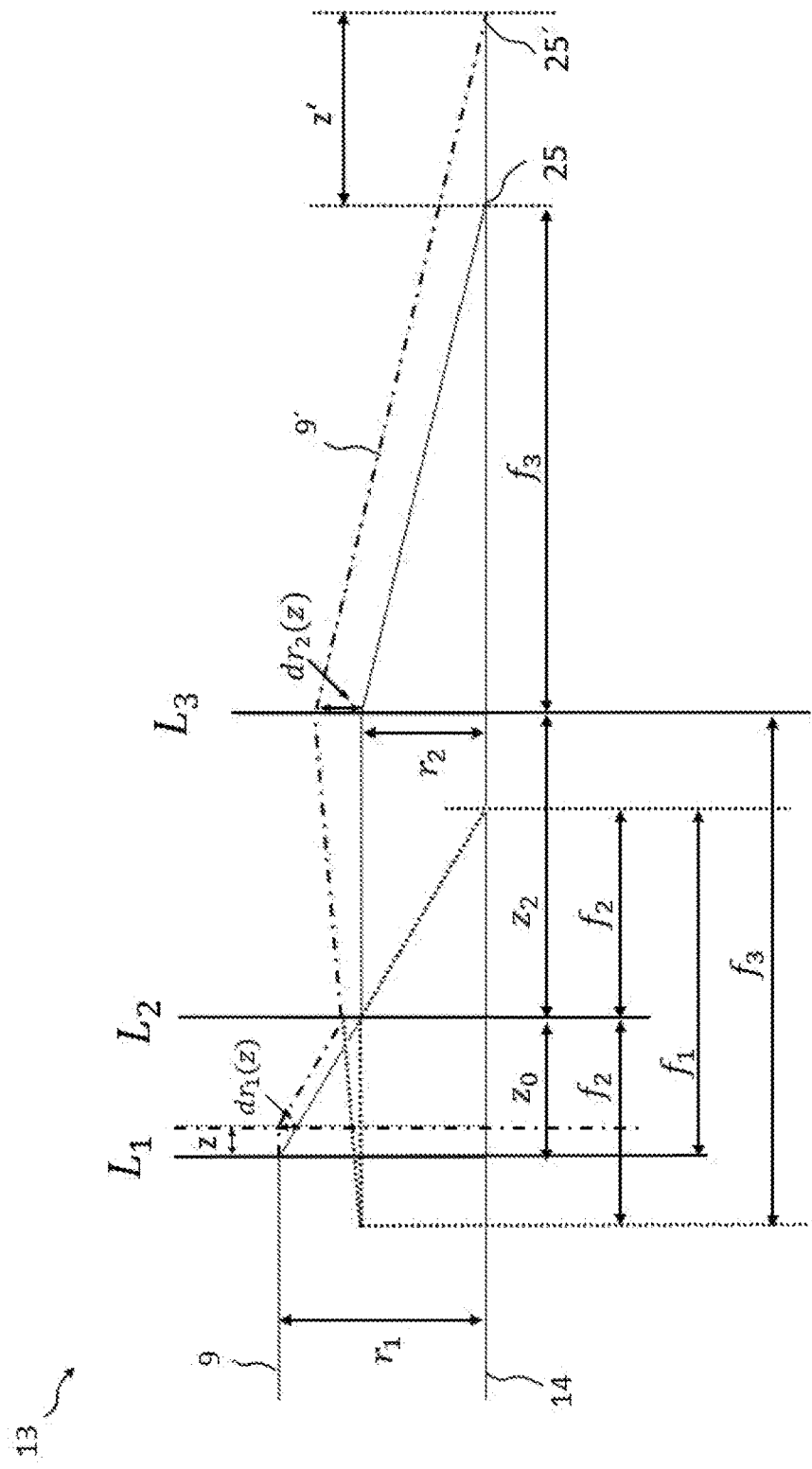
FIG. 2 shows a beam path in a focusing optics according to an embodiment.

FIG. 2 shows a beam path in a focusing optics according to an embodiment.

The beam path should in particular explain the functionality of the focusing optics 13 as a beam expander.

Three lenses L1, L2 and L3 with a focal length $f_1$, $f_2$ and $f_3$, respectively, are illustrated. The three lenses L1, L2 and L3 correspond to the three lenses 21, 22 and 23 shown in FIG. 1 which are arranged along an optical axis 14 of the focusing optics 13.

The beam path or the functionality of the beam expander is illustrated by means of marginal rays for two different positions of the movable lens L1.

At the first position of the lens L1 or at the first position of the focusing optics 13, the measuring light beam 9 is collimated between the lens L2 and L3 so that the light ray between the lenses L2 and L3 or the intermediate ray runs parallel to the optical axis 14 of the focusing optics 13. The distance z0 between the movable lens L1 and the immovable lens L2 and the distance z2 between the immovable lens L2 and the immovable lens L3 are also illustrated in FIG. 2.

The measuring light beam 9 is illustrated at the first position of the focusing optics 13 by a marginal ray in the form of a continuous line. At the first position of the focusing optics 13, the measuring light beam is focused at the focal point 25. At the second position, the movable lens L1 is shifted by a distance z in positive direction or towards the lens L2. The measuring light beam 9' is illustrated at the second position by a marginal ray in the form of a broken line. At the second position of the focusing optics 13, the measuring light beam is focused at the focal point 25'.

The marginal ray of the measuring light 9 at the first position is characterized by a beam radius r1 at the entry or at the first lens L1 and by the beam radius r2 of the collimated intermediate ray in the region between L2 and L3.

Due to the collimated beam guidance between the lenses L2 and L3 at the first position, the measuring light beam 9 is focused by lens L3 at a focal point 25 which is away from the lens L3 by f3. Said focal point F is at the same time the end point which defines the minimal working distance to the surface of the object to be measured.

In paraxial approximation, the numerical aperture at the first position is given by NA=r2/f3.

Also in paraxial approximation and by applying the intercept theorem, the movement z' of the focal point can be determined using the vertical displacement dr1(z) of the marginal ray at the first lens L1 and the vertical displacement dr2(z) of the marginal ray at the third lens L3 for the movement of the first lens L1 by z:

$$z'(z) = dr2(z)*f3/r2 = z*F;$$

By expressing dr2 and dr1 by system parameters, dr2=dr1*(f2−z2)/f2 and dr1=z*r1/f1, F can be expressed by:

$$F = r_1*/f_1*(f_2-z_2)/f_2*f_3/r_2 = NA1/NA*(f_2-z_2)/f_2, \quad (a)$$

wherein $NA = r_2/f_3$ and $NA1 = r_1/f_1$.

Using the identities $z_2 = f_2 + f_3$ and $f_1/r_1 = -f_2/r_2$, F is given by: $F = NA1^2/NA^2$.

In practice, an integer value will be given for F, for example F=4, 6 or 8, and by presetting NA, a suitable NA1 is determined by $$NA1 = +/- F^{1/2} * NA$$

The sign conforms to the ratio of the collimation diameters. For $r_1 > r_2$, NA1, $f_1$ are positive and $f_2$ is negative. For $r_1 < r_2$, NA1, $f_1$ are negative and $f_2$ is positive.

By presetting NA and the collimation diameters $r_1$, $r_2$, the focal lengths $f_1$, $f_2$, $f_3$ and the distances $z_0$, $z_2$ are fixed.

Figure 3:
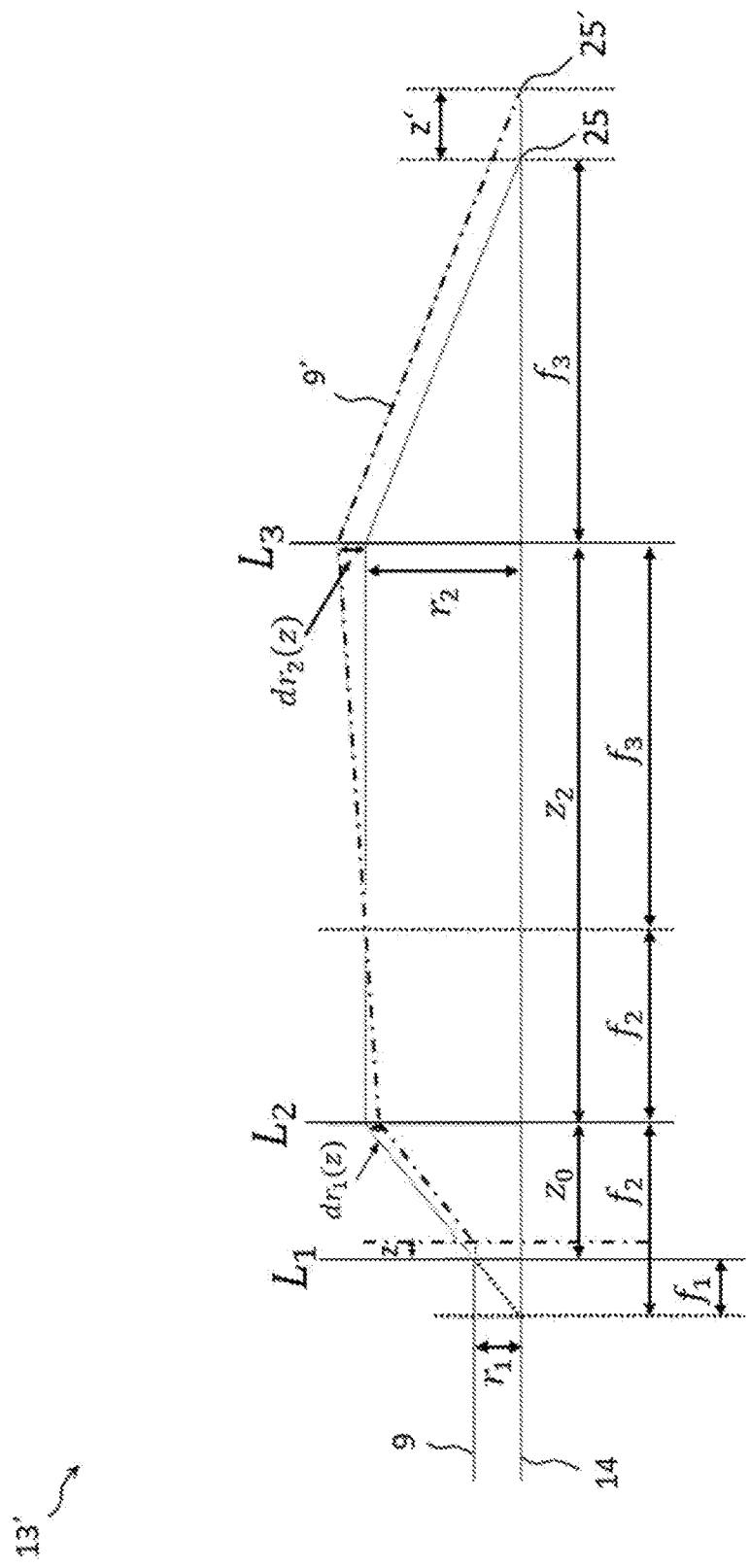
FIG. 3 shows a beam path in a focusing optics according to a further embodiment.

FIG. 3 shows a beam path in a focusing optics according to a second embodiment. Unlike the example of FIG. 1, the movable lens L1 of the focusing optics 13' of FIG. 3 is a diverging lens which comprises a negative refraction power or a negative focal length $f_1$. The second lens L2 is a converging lens with a positive focal length $f_2$. The remarks given above with respect to FIG. 2 are also applicable to FIG. 3, wherein the configuration of the focusing optics of FIG. 3 corresponds to the negative sign of the numerical aperture NA1. As can be seen in FIG. 3, by a positive movement z of the movable lens L1, a higher positive movement z' of the focal point from the focal point 25 at the first position to the focal point 25' at the second position is also effected in this case, wherein in this case r1<r2 or the ratio of the collimation diameters r1/r2 is smaller than one.

Figure 4:
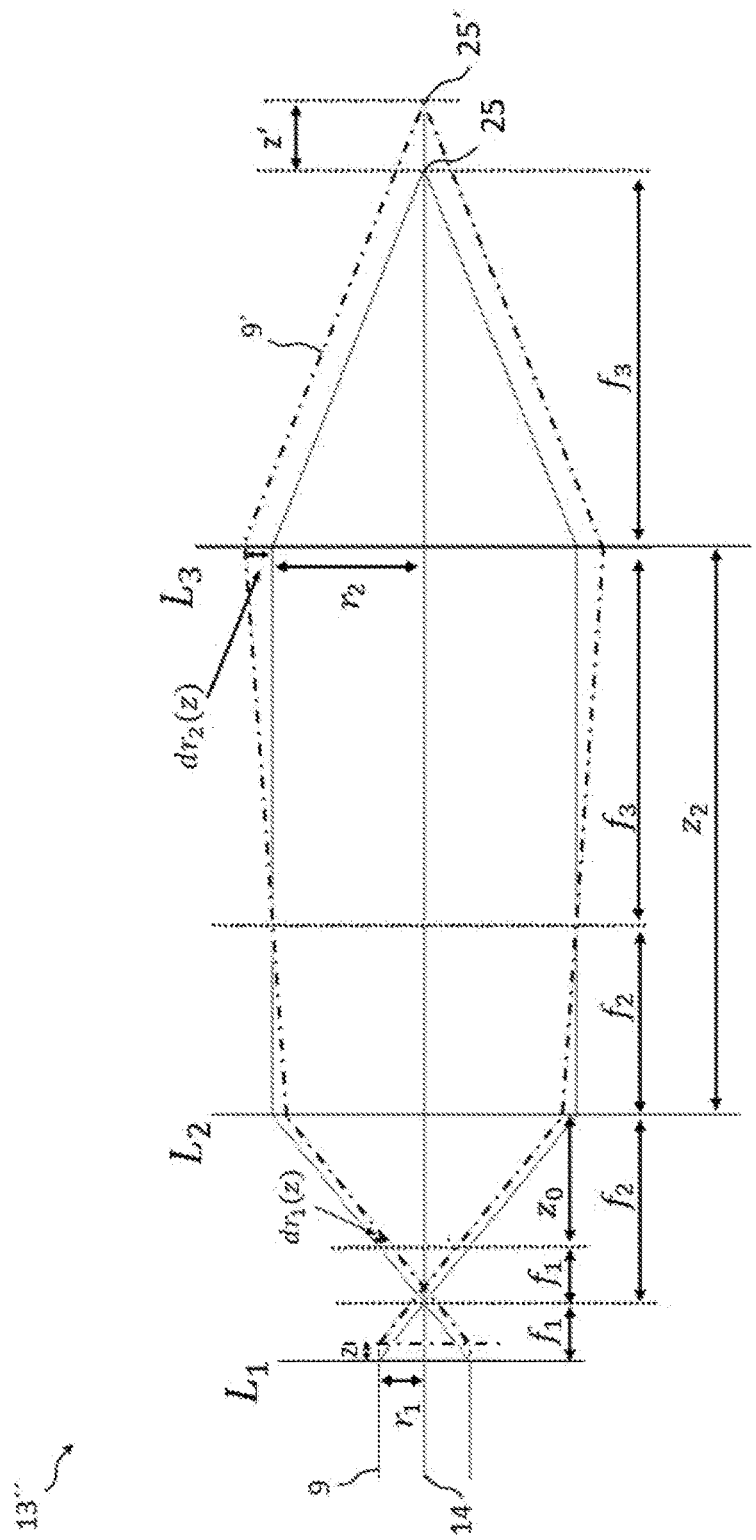
FIG. 4 shows a beam path in a focusing optics according to a further embodiment.

FIG. 4 shows a beam path in a focusing optics according to a further embodiment. In this embodiment of the focusing optics 13", all of the lenses L1, L2 and L3 of the beam expander are configured as converging lenses. Unlike the embodiments of FIGS. 2 and 3, the focal length $f_1$ of the first lens L1 and/or the distance between the first lens L1 and the second lens L2 is chosen such that the focal point of the lens L1 is in the region between L1 and L2, wherein, when moving the first lens L1 by a distance z in the positive direction, the focal point of L1 moves by a same distance z in the same direction, which leads to a higher movement z' of the focal point of the focusing optics from the focal point 25 at the first position to the focal point 25' at the second position. The ratio of the collimation diameters r1/r2 is smaller than one, similar to the configuration of FIG. 3. In this regard, the lens L1 in this configuration behaves like a diverging lens in the configuration of FIG. 3. Unlike the embodiment of FIG. 2 which, due to the beam guidance, resembles a Galilei telescope, the beam guidance in the embodiment of FIG. 3 corresponds to a Kepler telescope. These two optical concepts can thus be implemented in the beam expander of the distance measuring device.

Figure 5:
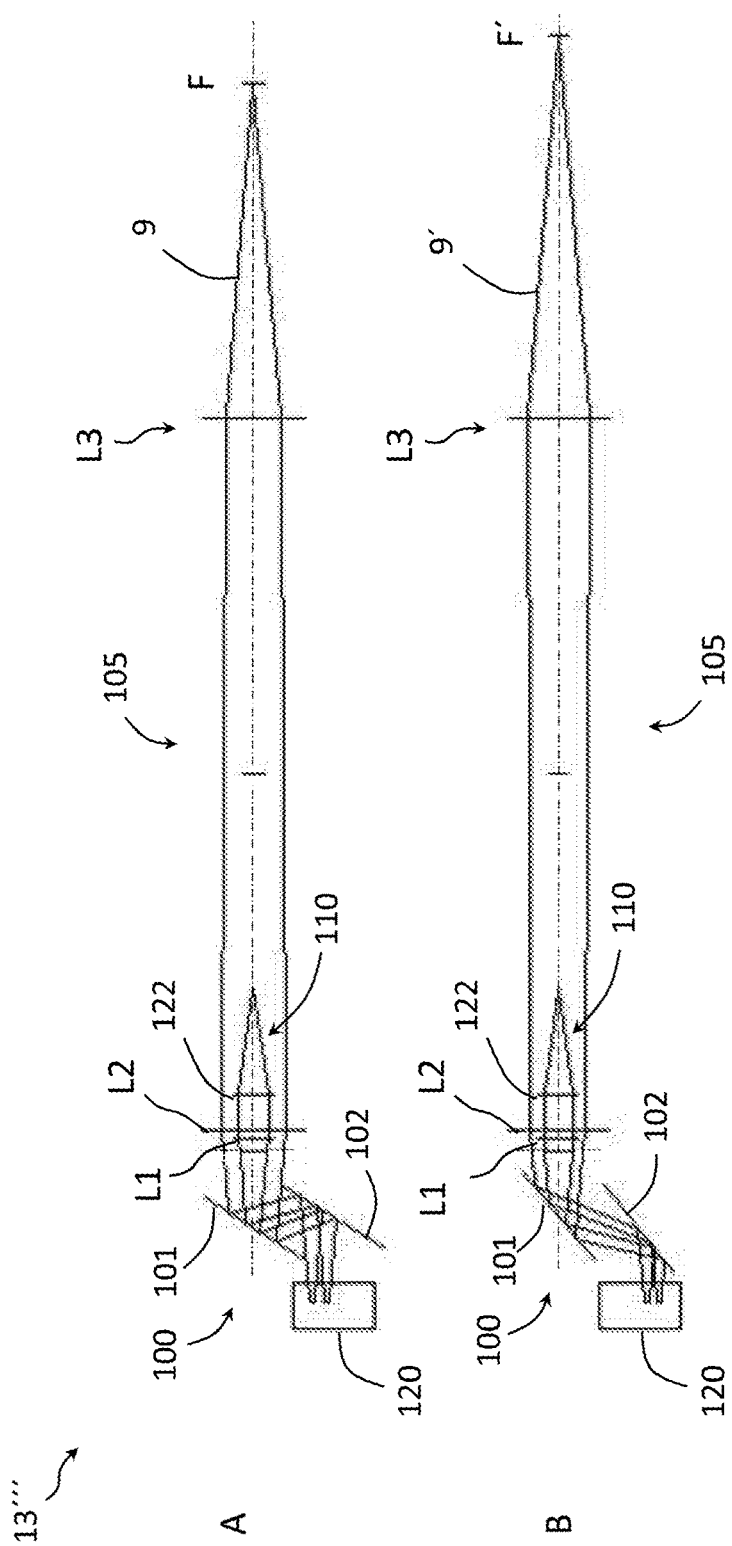
FIG. 5 shows a beam path in a focusing optics according to a further embodiment in side view.

FIG. 5 shows a beam path in a focusing optics according to a further embodiment in side view.

In FIG. 5, the focusing optics 13''' is shown in two settings A and B. The beam path is illustrated in the two cases A and B by the marginal rays of the light beams 9 and 9', respectively.

The focusing optics 13''' also comprises three lenses L1, L2 and L3. The lenses L2 and L3 are converging lenses and correspondent in their functionality to the lenses L2 and L3 of FIGS. 2 to 4. The beam 9 and 9', respectively, is focused by the lens L3 at the focal point F and F', respectively. The focusing optics 13''' comprises a main branch 105 and a secondary branch 110. The lens L1 is arranged in the secondary branch 110 of the focusing optics 13'''. Moreover, the secondary branch 110 comprises a collimation optics with the collimating lens 122. The light beam 9 and 9', respectively, at the lens L1 comprises a smaller diameter compared to the diameter of the light beam at the lenses L2 and L3.

The focusing optics 13''' further comprises a pivotable plane-parallel double mirror 100 with a first plane mirror 101 and a second plane mirror which are arranged at a distance from each other. The double mirror 100 is pivotable around an axis being perpendicular to the drawing plane which is centrally arranged between the mirrors or at a distance from the two plane mirrors 101, 102 being substantially identical. The double mirror 100 is driven by a Galvo turning device (not shown).

The main branch 105 and the secondary branch 110 are optically coupled to each other via an immovable or fixed rectangular prism 120, wherein the prism 120 causes a transverse displacement of the beam 9.

Figure 6:
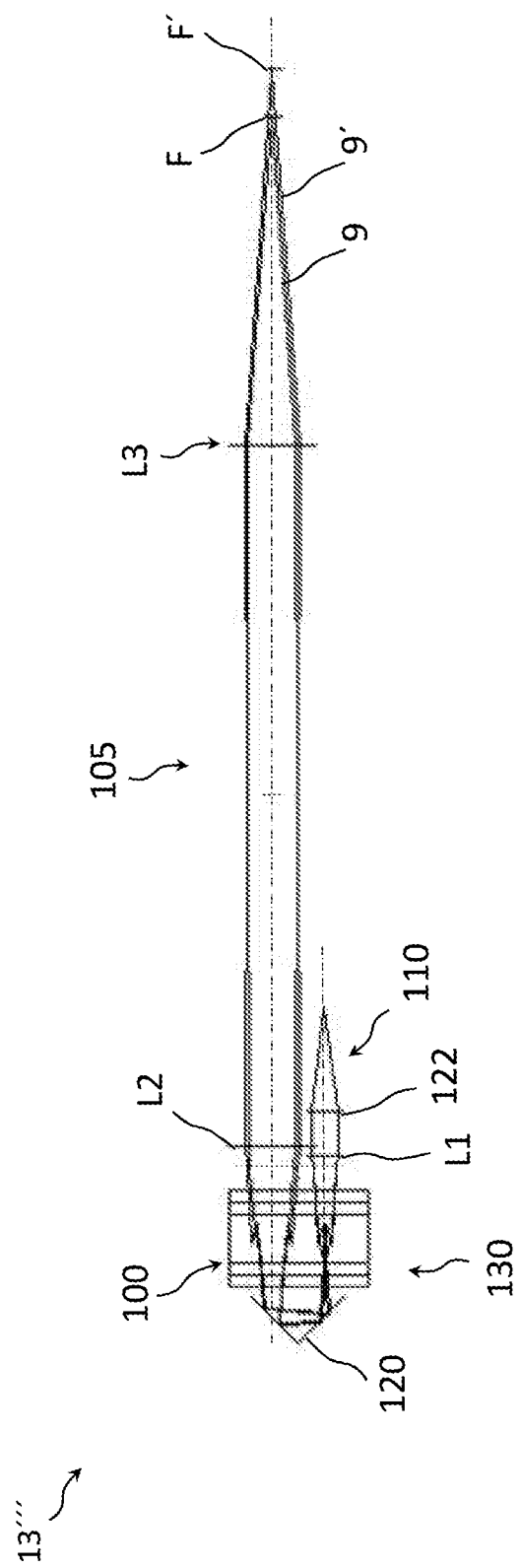
FIG. 6 shows the beam path in the focusing optics of FIG. 5 in top view.

FIG. 6 shows the beam path in the focusing optics of FIG. 5 in top view.

The beam path in case A and in case B of FIG. 5 are superimposed in order to illustrate the movement of the focal point from F to F' caused by the rotation of the double mirror 100.

In this view, the spatial arrangement of the fixed prism 120, the secondary branch 110, the main branch 105 and the double mirror 100 of the focusing optics 13''' is illustrated. In the top view of FIG. 6, it is also noticeable that the main branch 105 and the secondary branch 110 run parallel to each other with a horizontal displacement in the double mirror region 130 or in the region of the double mirror 100.

In the illustrated embodiment, the lenses L1, L2 and L3 comprise the focal lengths $f_1=20$ mm, f2=40 mm and f3=40, respectively.

The converging light coming from the lens L1 is sent back and forth through the plane parallel double mirror 100. The fixed or static rectangular prism 120 downstream the double mirror 100 provides to the light a lateral displacement for the return path.

Depending on the swiveling angle of the double mirror 100, the total path between entering position and displaced exiting position where lens L2 is placed is different, however the beam axis of the exiting beam remains at the same position.

In contrast to adjusting optics with axial guidance, using the Galvo turning device, the focusing optics can be adjusted in a simple and fast manner.

In this embodiment, the lens L1 is configured as a converging lens. Due to the length of the beam path through the focusing optics, an intermediate image is generated in the beam expander provided by L1 and L2, which extends the beam guidance between the lenses L1 and L2 by the length $2*f_1$, cf. FIG. 3. Due to the extended beam guidance, the double mirror 100 can be easily placed in the beam path of the focusing optics 13'''.

Figure 6A:
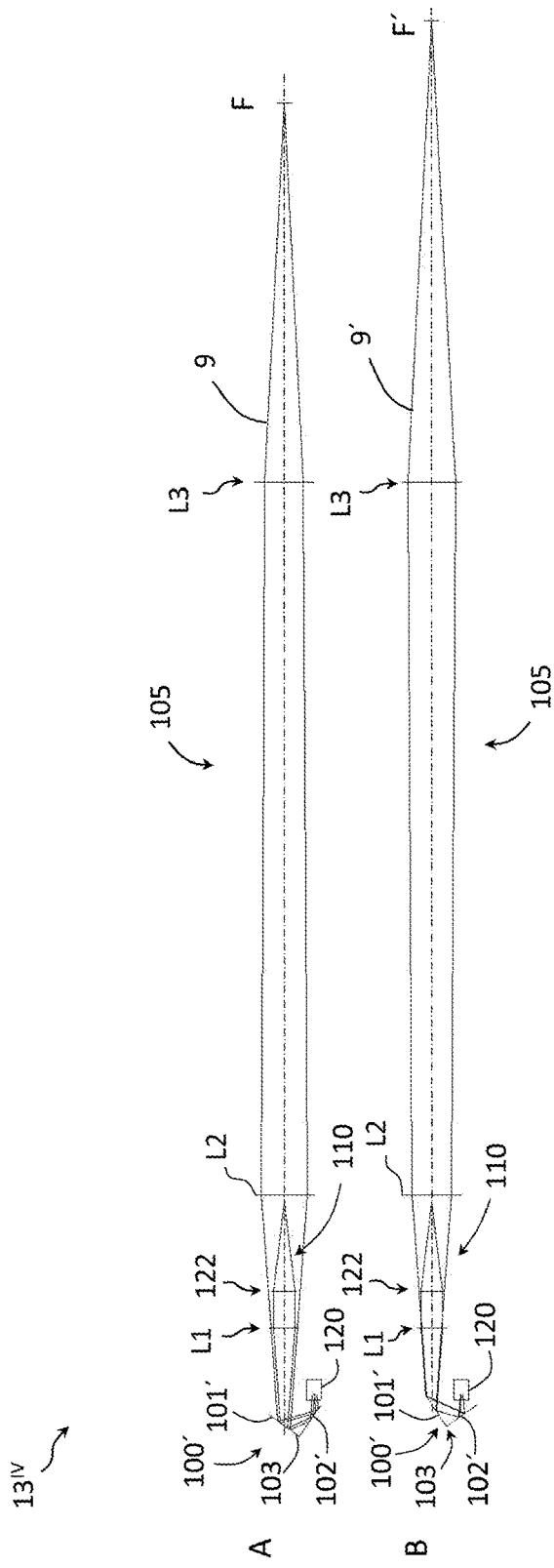
FIG. 6a shows a beam path in a focusing optics according to another embodiment in side view.

FIG. 6a shows a beam path in a focusing optics according to another embodiment in side view.

In FIG. 6a, the focusing optics $13^{IV}$ is shown in two settings A and B. The beam path is illustrated in the two cases A and B by the marginal rays of the light beams 9 and 9', respectively.

The focusing optics $13^{IV}$, similar to the focusing optics 13''' of FIG. 5, also comprises three lenses L1, L2 and L3. The lenses L2 and L3 are converging lenses and correspondent in their functionality to the lenses L2 and L3 of FIGS. 2 to 4. The focusing optics $13^{IV}$ comprises also a main branch 105 and a secondary branch 110. The lens L1 is arranged in the secondary branch 110 of the focusing optics $13^{IV}$. The secondary branch 110 further comprises a collimation optics with the collimating lens 122. The light beam 9 and 9', respectively, at the lens L1 comprises a smaller diameter compared to the diameter of the light beam at the lenses L2 and L3. The beam 9 and 9', respectively, is focused by the lens L3 at the focal point F and F', respectively.

The focusing optics $13^{IV}$ further comprises a pivotable plane-parallel double mirror 100' with a first plane mirror 101' and a second plane mirror 102". Different to the embodiment of FIG. 5, is the double mirror 100' formed as a rectangular double mirror in which the plane mirrors 101' and 102' form right angle to each other.

In the side view of FIG. 6a, both plane mirrors 101' and 102' are perpendicular to the drawing plane and the double mirror 100' is pivotable around an axis being perpendicular to the drawing plane. The double mirror 100 is driven by a Galvo turning device (not shown). The rotation axis lies parallel to the edge 103 built by the plane mirrors 101' and 102' of the double mirror 100'. In the present embodiment, the rotation axis essentially coincides with the edge 103 of the double mirror 100'.

The main branch 105 and the secondary branch 110 are optically coupled to each other via an immovable or fixed rectangular prism 120, wherein the prism 120 causes a transverse displacement of the beam 9.

Figure 6B:
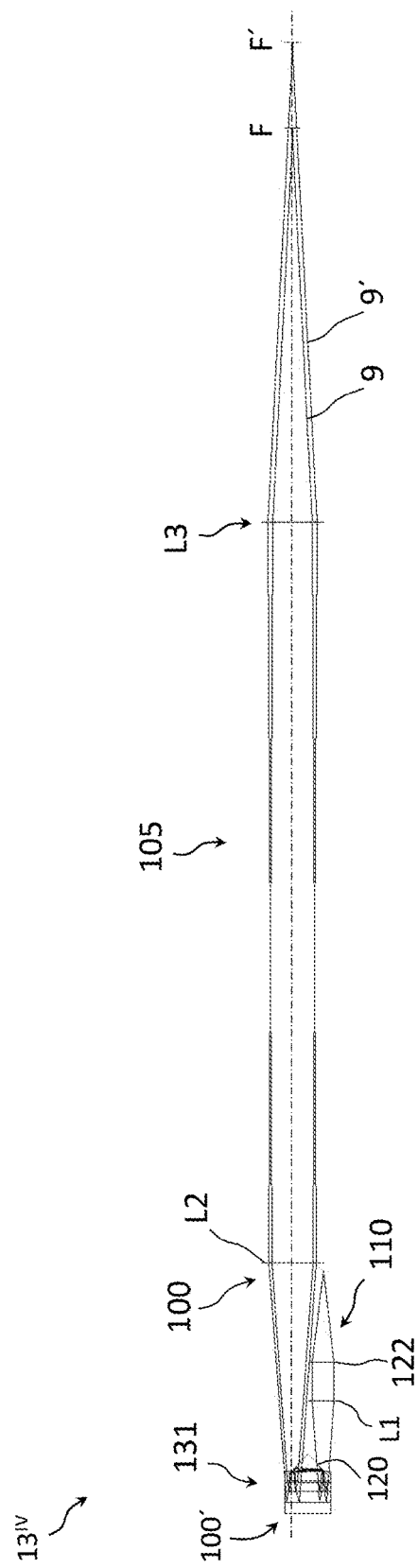
FIG. 6b shows the beam path in the focusing optics of FIG. 6a in top view.

FIG. 6b shows the beam path in the focusing optics of FIG. 6a in top view.

The beam path in case A and in case B of FIG. 5 are superimposed in order to illustrate the movement of the focal point from F to F' caused by the rotation of the double mirror 100'.

In this view, the spatial arrangement of the fixed prism 120, the secondary branch 110, the main branch 105 and the double mirror 100 of the focusing optics $13^{IV}$ is illustrated. In the top view of FIG. 6b, it is also noticeable that the main branch 105 and the secondary branch 110 run parallel to each other with a horizontal displacement in the double mirror region 130 or in the region of the double mirror 100'.

In the illustrated embodiment, the lenses L1, L2 and L3 comprise the focal lengths $f_1$=20 mm, f2=40 mm and f3=40, respectively.

The converging light coming from the lens L1 is sent back and forth through the plane parallel double mirror 100'. The fixed or static rectangular prism 120 downstream the double mirror 100' provides to the light a lateral displacement for the return path.

Depending on the swiveling angle of the double mirror 100', the total path between entering position and displaced exiting position where lens L2 is placed is different, however the beam axis of the exiting beam remains at the same position.

In contrast to adjusting optics with axial guidance, using the Galvo turning device, the focusing optics can be adjusted in a simple and fast manner.

In this embodiment, the lens L1 is configured as a converging lens. Due to the length of the beam path through the focusing optics, an intermediate image is generated in the beam expander provided by L1 and L2, which extends the beam guidance between the lenses L1 and L2 by the length $2*f_1$, cf. FIG. 4. Due to the extended beam guidance, the double mirror 100 can be easily placed in the beam path of the focusing optics $13^{IV}$.

Figure 7:
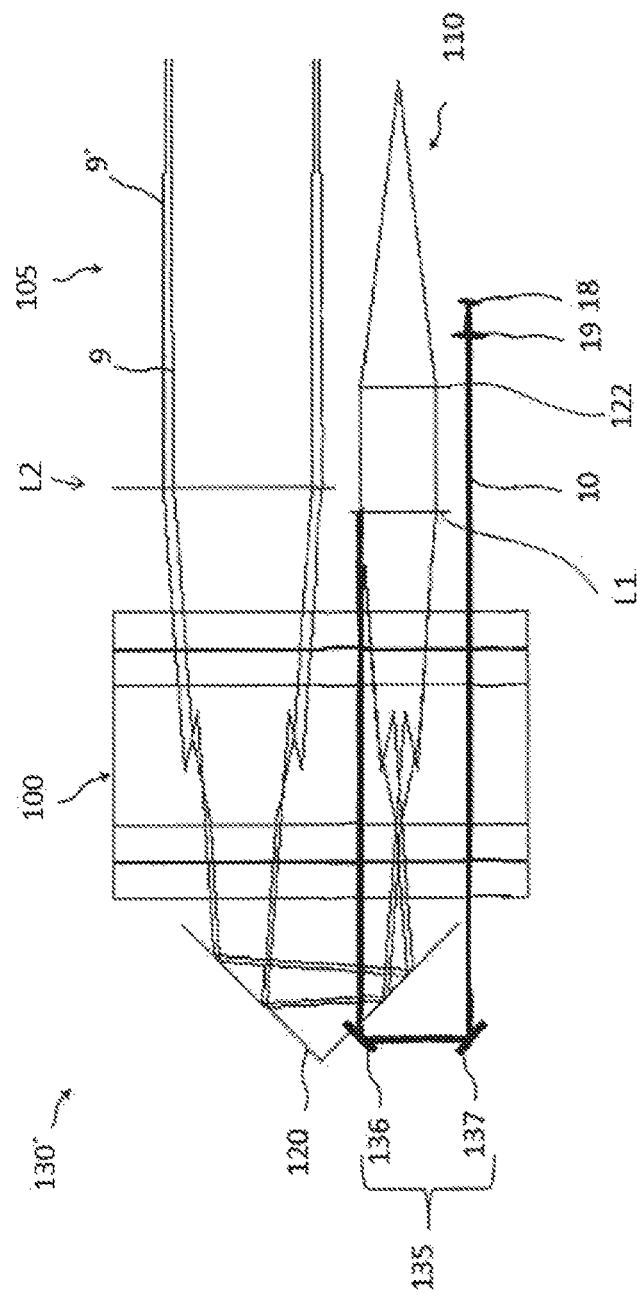
FIG. 7 shows a detailed view of the beam path in a focusing optics with adjustment of the reference arm according to an embodiment.

FIG. 7 shows a detailed view of the beam path in a focusing optics with adjustment of the reference arm according to an embodiment.

In FIG. 7, the double mirror region 130' of the beam path is illustrated in an enlarged view.

In this embodiment, a divided reference beam 10 which is illustrated as a thick line is also sent through the focusing optics 13'''. The reference beam 10 is sent back through the double mirror 100 by a pair of mirrors 135 with two mirrors 136 and 137 positioned to each other by 90°. The reference beam 10 is reflected back by the end mirror 18 with focusing optics 19 connected upstream. Already by reflecting back the reference light 10 by the pair of mirrors 135, the folding number N=1 is obtained.

Thus, the length of the reference arm can be adjusted to a movement of the focal point during an adjustment of the focusing optics or during a rotation of the double mirror.

Figure 8:
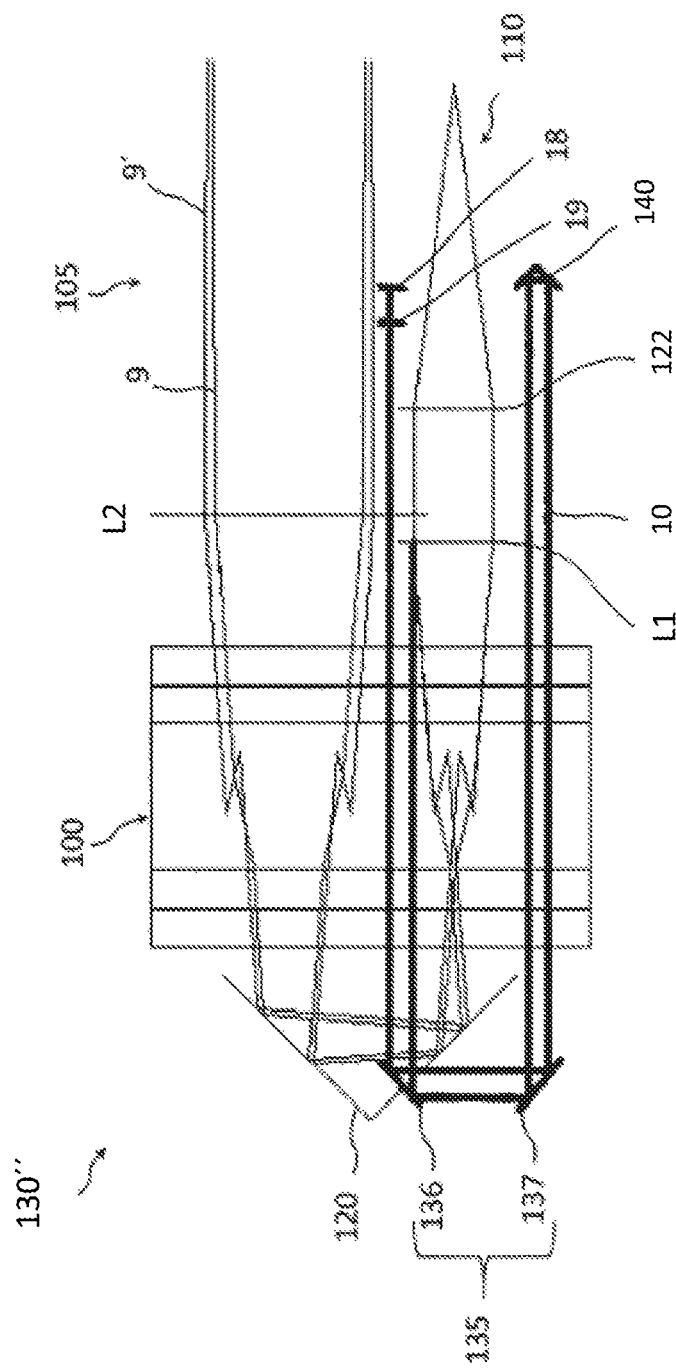
FIG. 8 shows a detailed view of the beam path in a focusing optics with adjustment of the reference arm according to a further embodiment.

FIG. 8 shows a beam path in the focusing optics with adjustment of the reference arm according to a further embodiment.

In the embodiment of FIG. 8, a folding number N=2 is realized. Unlike in FIG. 7, a retroreflector 140 for reflecting back the reference beam 10 is provided here. Similar to the embodiment of FIG. 7, the reference beam 10 is sent through the double mirror 100 and is reflected back by the pair of mirrors 135. However, the retroreflector 140 causes that the reference beam passes through the section of the double mirror once again until it is reflected back by the end mirror 18.

Figure 9:
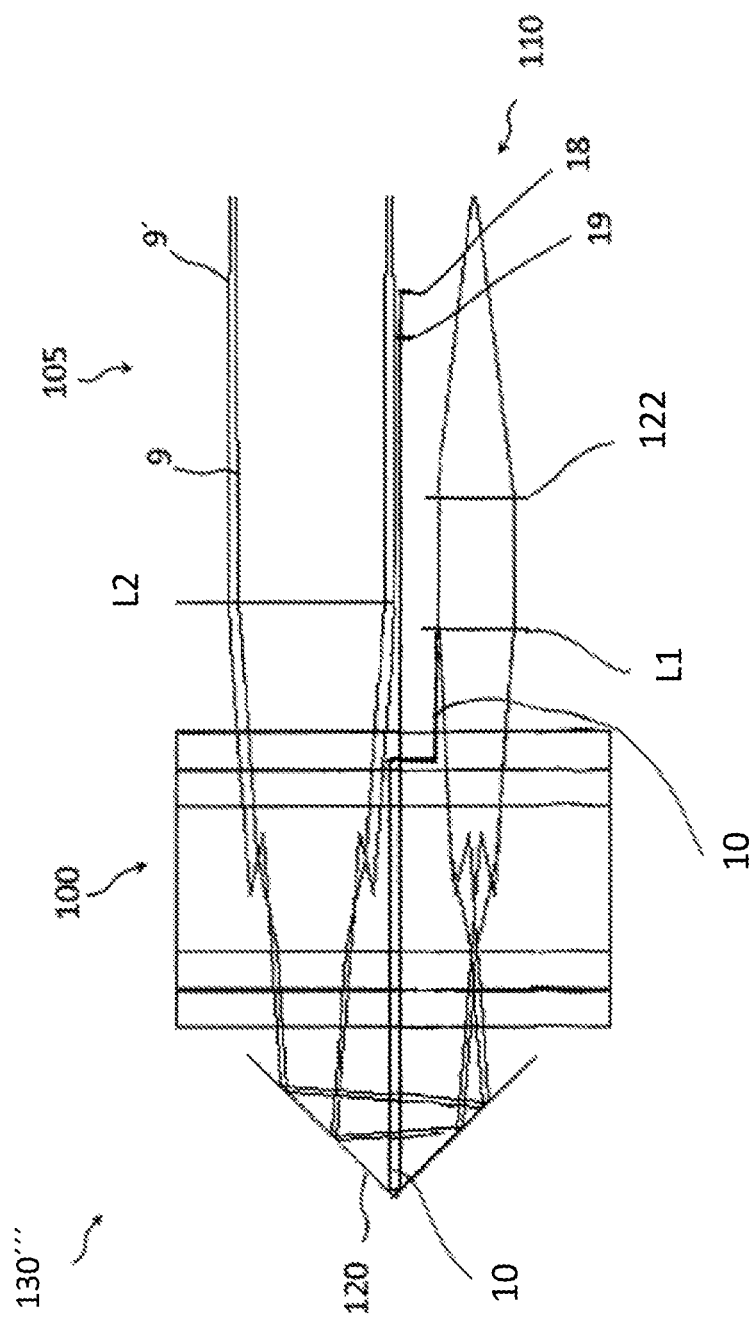
FIG. 9 shows a detailed view of the beam path in a focusing optics with adjustment of the reference arm according to a further embodiment.

FIG. 9 shows a detailed view of the beam path in a focusing optics with adjustment of the reference arm according to a further embodiment. Using a pair of mirrors (not shown), a reference beam 10 is diverted and is sent through the double mirror 100. The reference beam is oriented such that it is reflected back to the double mirror 100 by the rectangular prism 120. The rectangular prism 120 thus serves as a path delimiter or as a retroreflector for both the measuring beam 9 and the reference beam 10, whereby the optical system can be significantly simplified.

Figure 10:
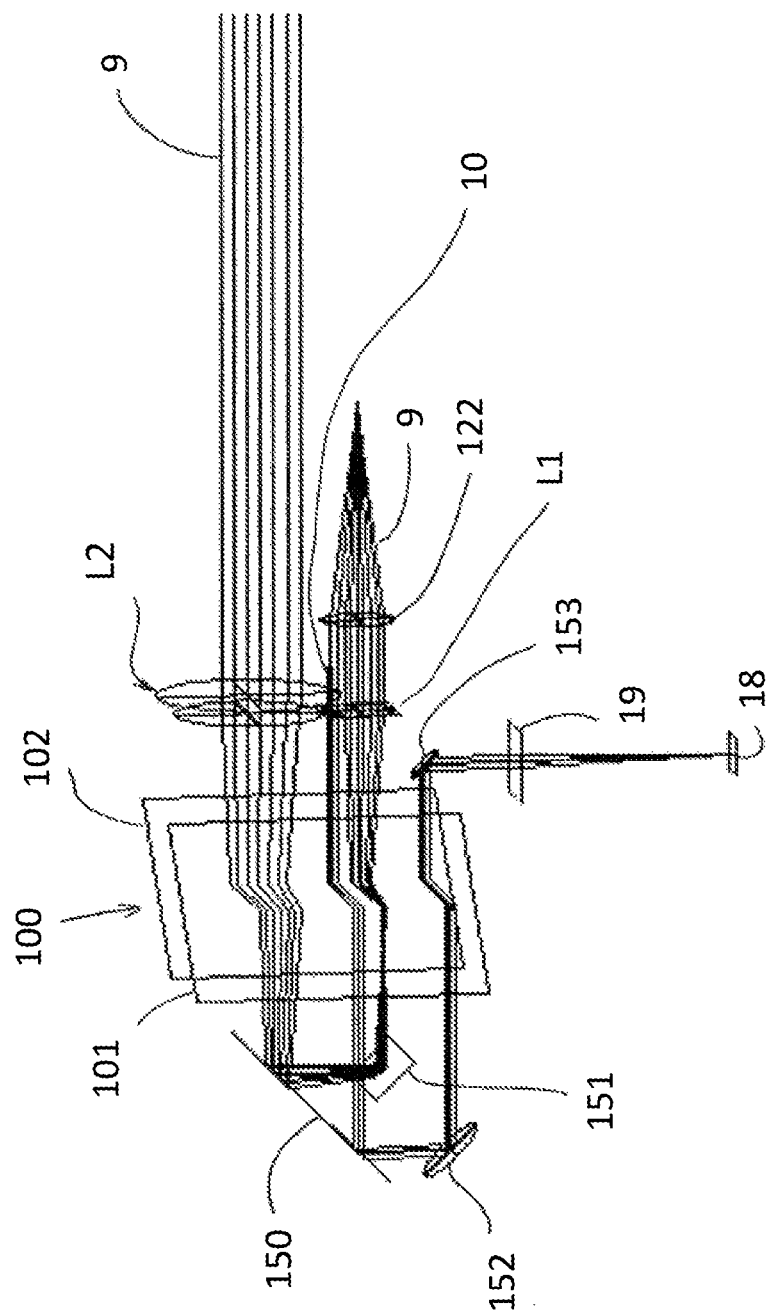
FIG. 10 shows a detailed view of the beam path in a focusing optics with adjustment of the reference arm according to a further embodiment.

FIG. 10 shows a detailed view of the beam path in a focusing optics with adjustment of the reference arm according to a further embodiment.

The focusing optics of FIG. 10 is constructed similar to the focusing optics of the above examples. The focusing optics comprises a pivotable double mirror 100 with the plane mirrors 101 and 102 and beam expander lenses L1, L2, and L3. The lens L3 and the focused beam, respectively, are not captured by the range of the detailed view. The focusing optics comprises plane mirrors 150, 151, 152, 153 for beam guidance. The measuring light beam 9 is sent back in the double mirror 100 by the plane mirrors 151 and 150 after passing the double mirror 100.

Before entering the double mirror 100, a part of the measuring light is diverted as reference beam 10 which is sent through the double mirror 100 on a separate path. The reference beam is sent back to the double mirror 100 by the mirrors 150 and 152, whereupon it is directed through the focusing optics 19 to the end mirror 18 by mirror 153. The reference beam 10 is reflected back by the end mirror 18, so that the reference beam passes through the double mirror system once again.

In this embodiment of the focusing optics, a folding number N=1 of the reference arm is thus realized.

Figure 11:
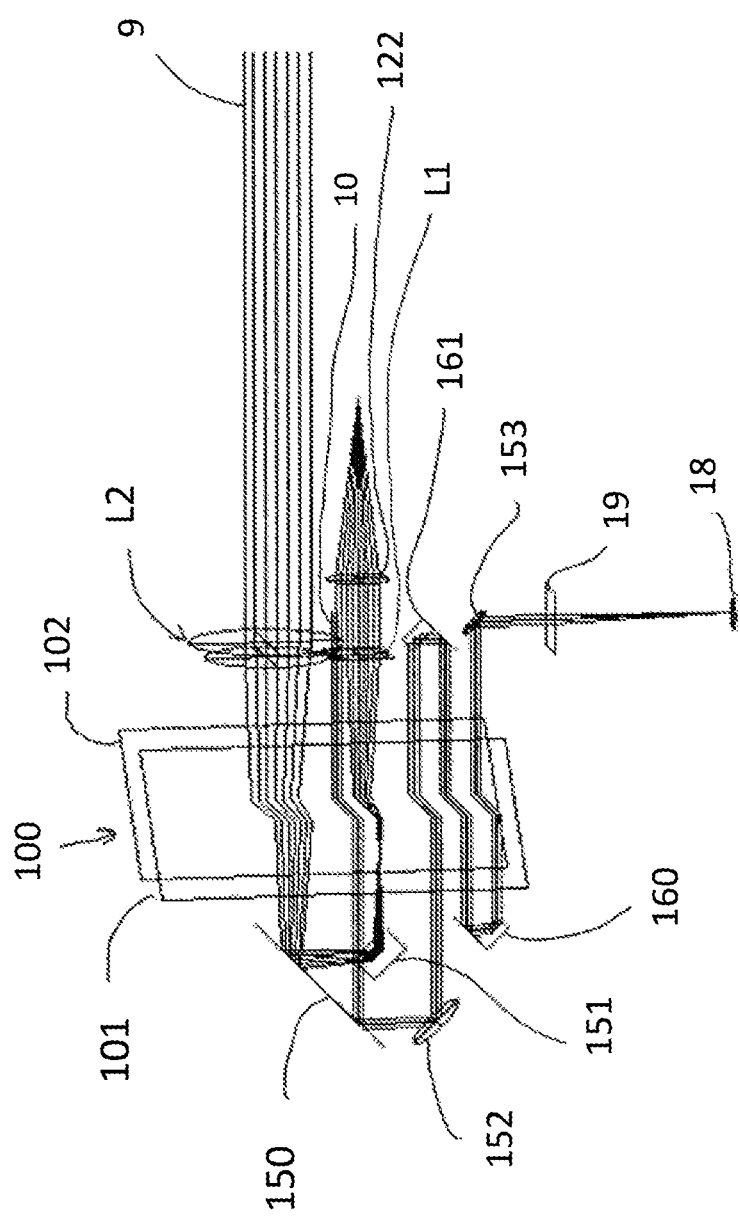
FIG. 11 shows a detailed view of the beam path in a focusing optics with adjustment of the reference arm according to a further embodiment.

FIG. 11 shows a detailed view of the beam path in a focusing optics with adjustment of the reference arm according to a further embodiment.

The focusing optics of FIG. 11 is constructed similar to the focusing optics of the above examples. In addition to the elements illustrated in FIG. 10, the focusing optics of FIG. 11 comprises retroreflectors 160 and 161 on both sides of the double mirror 100, so that the reference beam 10 can be sent back and forth again through the double mirror 100.

Thus, in this embodiment of the focusing optics, a folding number N=2 of the reference arm can be realized.

The guidance of the reference beam shown in FIGS. 7 to 11 can be applied to the focusing optics $13^{IV}$ shown in FIGS. 6a and 6b in an analogous manner.

Figure 12:
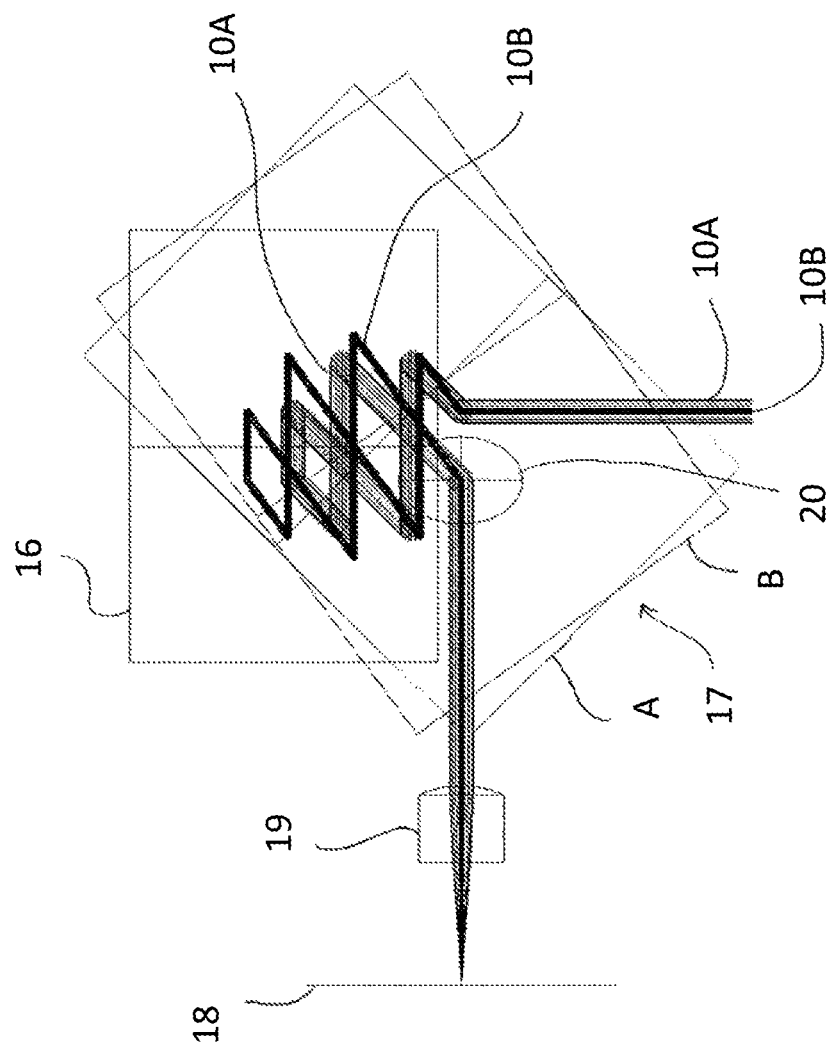
FIG. 12 shows a beam path through a folded light way according to an embodiment.

FIG. 12 shows a beam path through a folded light way according to an embodiment.

The light way illustrated in FIG. 12 corresponds to the folded light way 15 of FIG. 1 which is defined by two path delimiters 16 and 17. The path delimiters 16 and 17 are configured as an immovable retroreflector and a movable retroreflector, respectively. Additionally, the path delimiter 17 is pivotable around an axis parallel to the optical axis of the folded light way.

In FIG. 12, two swiveling positions A and B of the retroreflector 17 and a respective beam path of the reference light 10A and 10B corresponding to said two swiveling positions of the retroreflector 17 are illustrated. The reference light is inserted into the folded light way by an adjusting mirror (not shown). The adjusting mirror 20 directs the light beam out of the folded light way to the end mirror 18 being arranged downstream the focusing optics 19. The light or the reference light beam can experience different numbers of reflections between the prismatic optical elements depending on the swiveling position of the retroreflector 17.

In the position A of the retroreflector 17, the light beam or the reference beam 10A which is illustrated by several thin lines passes back and forth four times through the light way on the way to the end mirror which corresponds to a folding number of N=8.

In the position B, the reference light beam 10B which is illustrated by a thick line passes back and forth five times through the light way on the way to the end mirror which corresponds to a folding number of N=10.

FIG. 12 thus illustrates how the folding number N of the light way being based on prismatic optical elements can be adjusted in a simple manner by rotating the prismatic optical elements with respect to each other.

Figure 13:
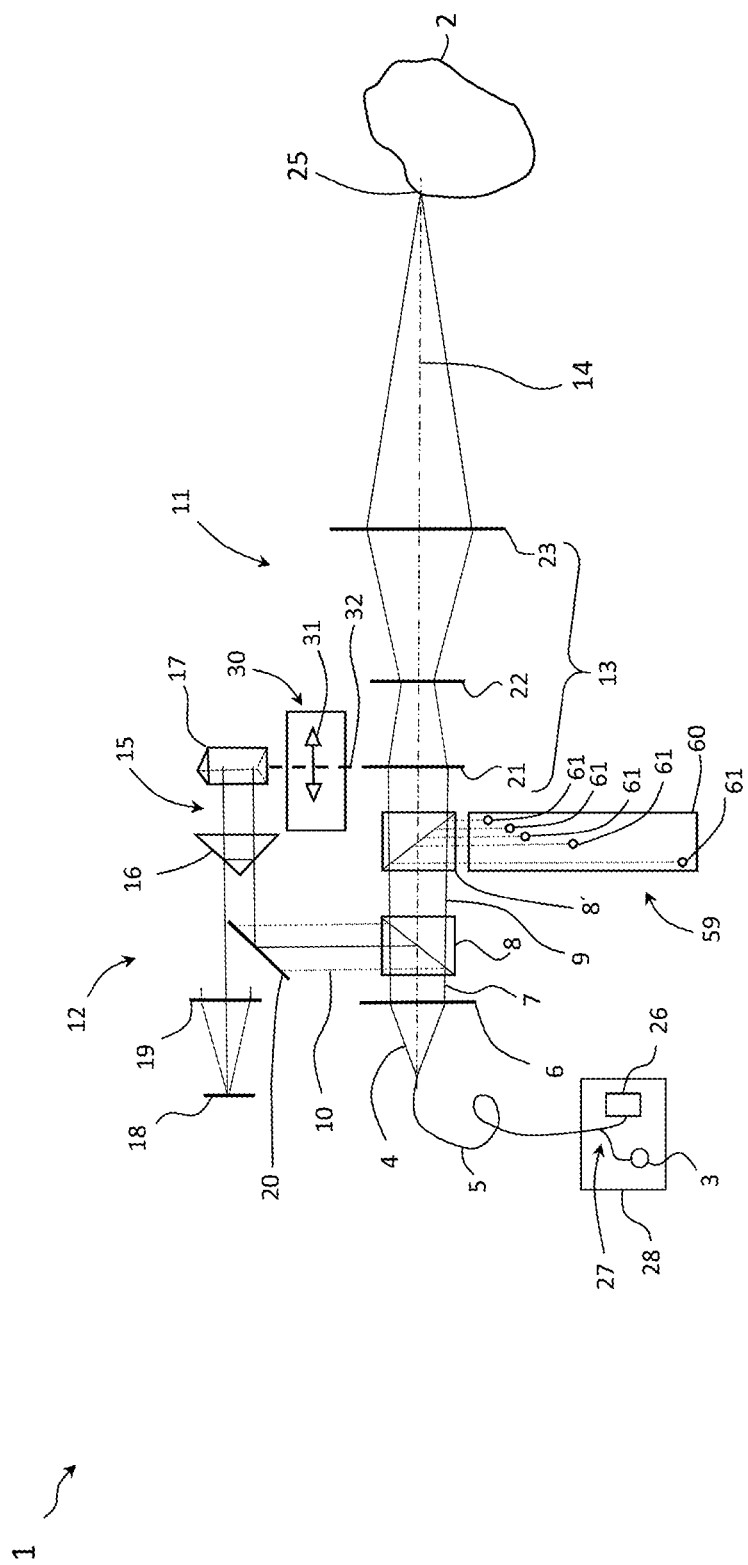
FIG. 13 shows a schematic configuration of a distance measuring device according to a further embodiment.

FIG. 13 shows a schematic configuration of a distance measuring device according to a further embodiment.

The distance measuring device 1 of FIG. 13 corresponds substantially to the distance measuring device of FIG. 1 and additionally comprises a calibration branch 59 with a reference plate 60 for performing precise distance measurements.

A part of the measuring light beam 9 is diverted from the object arm 11 by a beam splitter 8' and is directed along a surface of the reference plate 60. The reference plate 60 comprises reflective indicators 61 or position indicators which can reflect the light diverted from the object arm 11 back for spectrometric analysis. The reference plate 60 can be used as an object with materially or permanently anchored known distances $z_{reference\ plate}(i)$ for different indicator numbers i for verifying a calibration of the distance measuring device 1.

The path difference to individual indicators 61 can be determined during an OCT measurement mode, so that the measuring distance $z_{object} = z_{reference\ plate}(i) + dz - dz(i)$ can be determined in an absolute way.

The indicators 61 are configured as small glass beads with a refractive index of about n=1.982. The collimated or parallel light rays entering the glass beads are focused on the back wall of the glass beads so that they can be reflected back collimatedly on the inverse path. The glass beads may comprise a size of about 15 μm to about 300 μm, in particular of about 20 μm to about 100 μm. For increasing the reflectivity of the glass bead, the back wall of the glass bead can be provided with a highly reflective coating, in particular a metallic coating.

Instead of glass beads, the indicators 61 can be configured as corner cube retroreflector mirrors. Such corner cube retroreflector mirrors as well as the glass beads comprise a high alignment tolerance and high reflectivity.

The reference plate may comprise a material with a thermal expansion coefficient below 0.5 ppm/K. For example, the reference plate may comprise quartz glass or glass ceramics on a Li2O/Al2O3/nSiO2 basis or a Fe(64%)/Ni(36%) alloy.

The reference plate may also be configured as a stair body with steps of approximately 20 μm height. The width of the steps should be smaller than the measuring range of the OCT sensor.

Additionally or alternatively to the reference plate 60, a dispatcher may be provided for a precise distance measurement. The dispatcher may comprise a plurality of calibrated light ways with different lengths and an optical switch which can couple the measuring light or the reference light to one light way of the dispatcher at a time. The light ways of the dispatcher may in particular be configured as optical channels or optical fibers provided with a reflective coating on either end, wherein the optical switch is configured as a pivotably mounted adjustable mirror, so that the light can be coupled to an optical channel at a time depending on the position of the adjustable mirror.

The calibration branch 59 is configured such that it can be switched on and off by for example a movable diaphragm arranged between the beam splitter 8' and the reference plate 59. Thus, the calibration branch can be deactivated as needed, so that check measurements can be performed without being disturbed by the reference peaks caused by the indicators 61.

Figure 14:
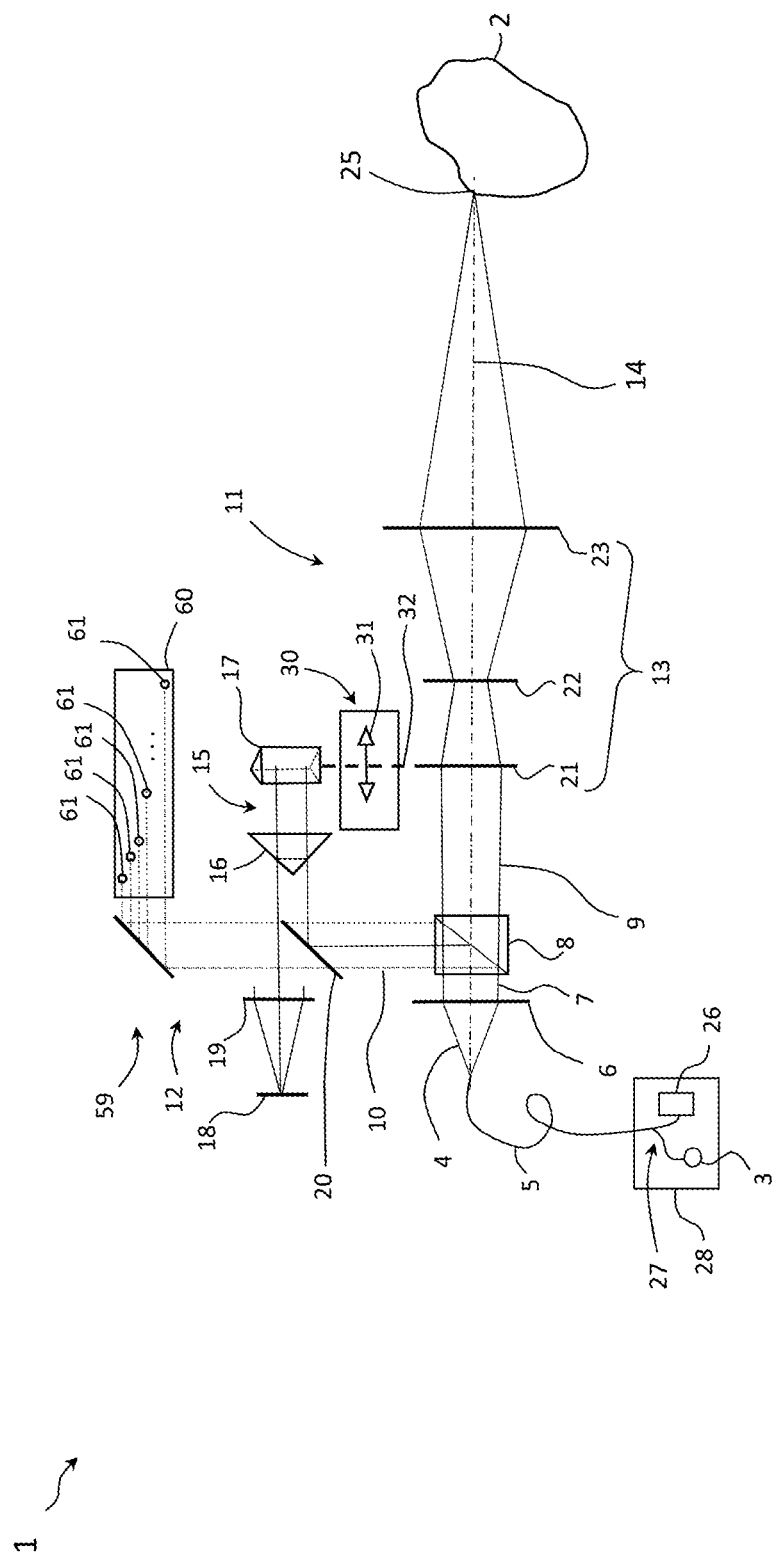
FIG. 14 shows a schematic configuration of a distance measuring device according to a further embodiment.

FIG. 14 shows a schematic configuration of a distance measuring device according to a further embodiment.

The distance measuring device 1 of FIG. 14 corresponds substantially to the distance measuring device of FIG. 13, wherein the calibration branch 59 is provided in the reference arm 12.

The adjusting mirror 20' is configured in this example as a semireflecting mirror 20', so that the reference beam 10 being diverted by the beam splitter can partially reach through the adjusting mirror 20' to an adjustable entering mirror 62 of the calibration branch 59.

If required, the entering mirror 62 can be adjusted such that the calibration branch is cut so that the OCT measurement is not disturbed by the presence of reference peaks caused by the indicators 61 of the reference plate 60.

A part of the measuring light beam 9 is diverted from the object arm 11 by a beam splitter 8' and is directed along a surface of the reference plate 60. The reference plate 60 comprises reflective indicators 61 or position indicators which can reflect the light diverted from the object arm 11 back for spectrometric analysis. The reference plate 60 can be used as an object with materially or permanently anchored known distances $z_{reference\ plate}(i)$ for different indicator numbers i for verifying a calibration of the distance measuring device 1.

Figure 15:
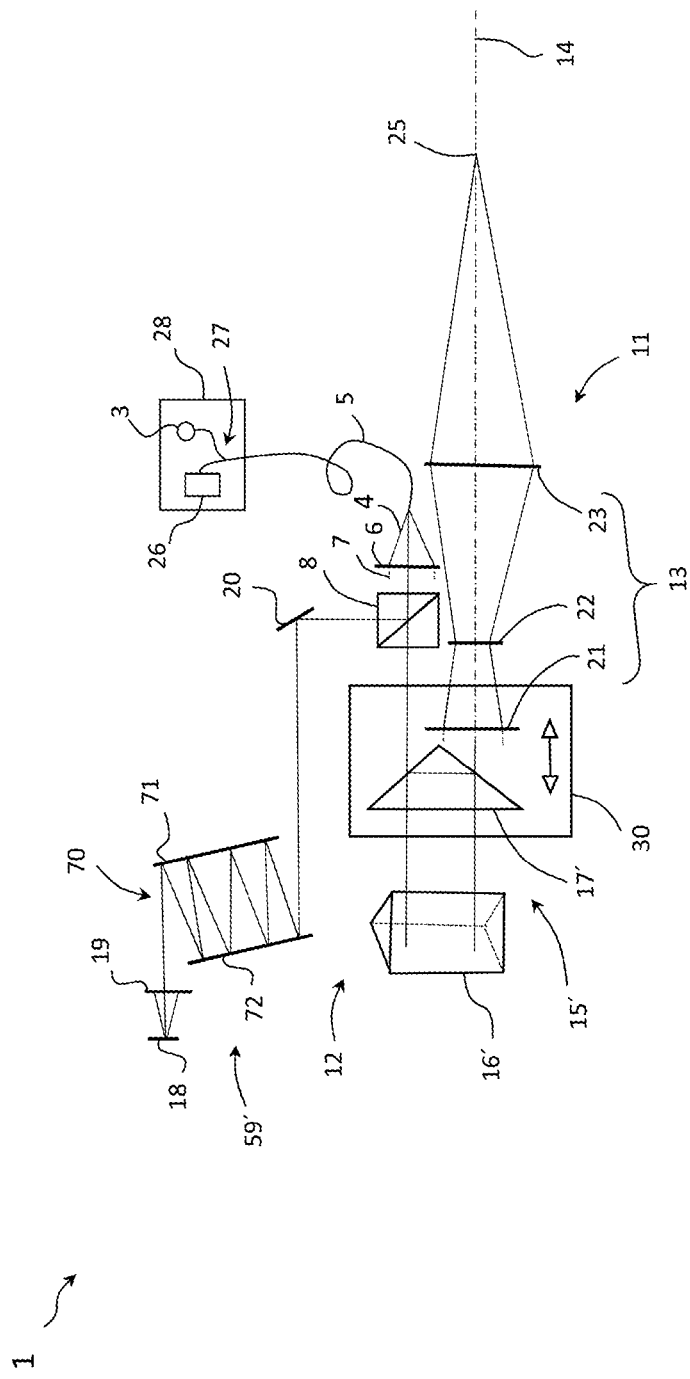
FIG. 15 shows a schematic configuration of a distance measuring device according to a further embodiment.

FIG. 15 shows a schematic configuration of a distance measuring device according to a further embodiment.

The distance measuring device 1 is constructed substantially similar to the distance measuring devices of the above examples. Moreover, the focusing optics 13 or the beam expander with three coaxially positioned lenses 21, 22, and 23 is constructed similar to the focusing optics of the above described examples.

In this embodiment, a part of the collimated light beam 7 is diverted by a beam splitter 8 and is input to a calibration branch 59' by an adjusting mirror 20. The calibration branch 59' comprises two parallel plane mirrors 71 and 72 separated by an air gap 70. The calibration branch 59' further comprises an end mirror 18 with a focusing optics 19 and is configured such that the light diverted by the beam splitter 8 experiences an interflection between the two plane mirrors 71 and 72 and can be reflected by the end mirror 18 back to the beam splitter 8 and to the spectrometer 26 for being analyzed.

A folded light way is thus provided in the calibration branch 59' with the predefined air gap 70. The folding number N of the folded light way can be adjusted by a suitable orientation of the air gap, so that a calibration section with a predefined length is provided by the plane mirrors 71 and 72.

Moreover, a folded light way 15' is provided in this arrangement as an extension of the measuring arm or the object arm 11, so that an inaccuracy of the z-movement caused for example by an adjustment inaccuracy of the adjusting axis is multiplied by the folded light way 15'. In this configuration, smallest adjustment errors are amplified by the N-fold folding such that they can be easily determined and eliminated.

Figure 16:
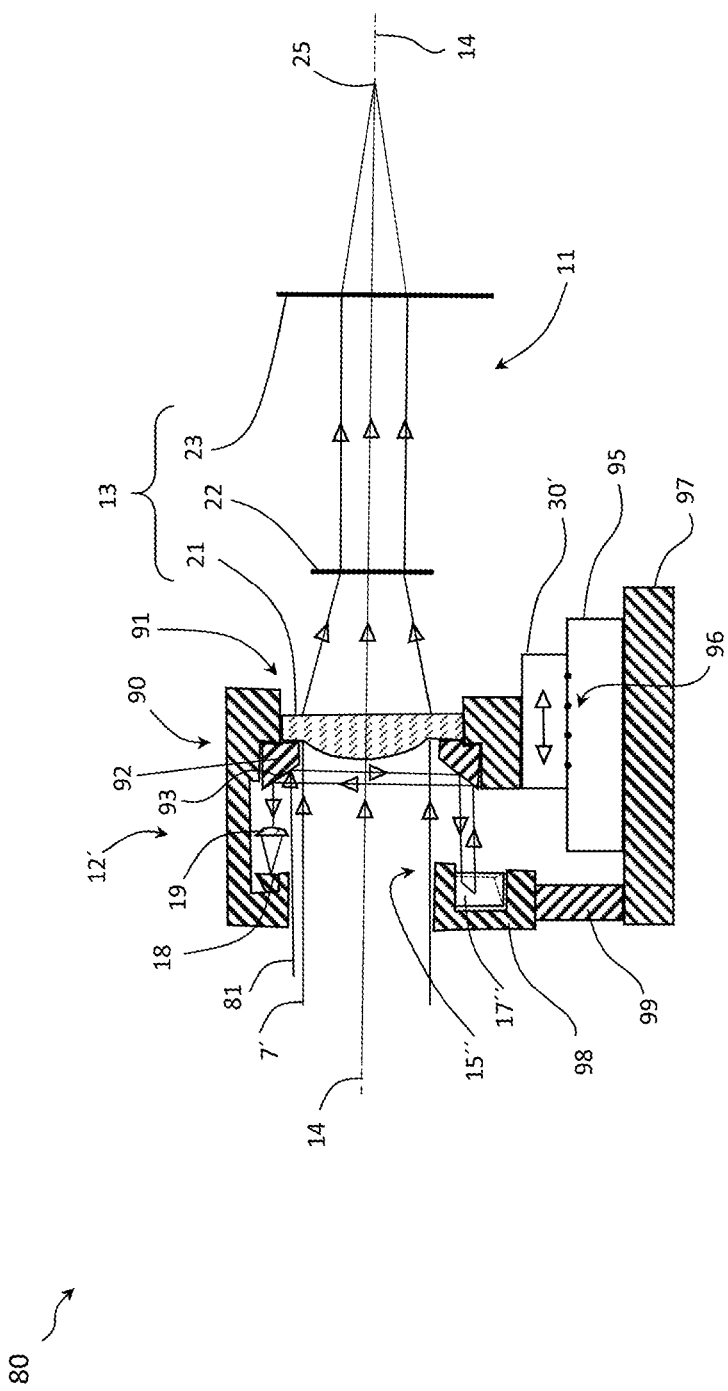
FIG. 16 shows a beam path of a distance measuring device according to a further embodiment.

FIG. 16 shows a beam path of a distance measuring device according to a further embodiment.

In particular, the beam path 80 in an object arm 11 and in a reference arm 12' is illustrated in FIG. 16. The light beams are visualized by continuous lines with arrows, wherein the collimated light beam 7' with a peripheral partial beam 81 is radiated from the left-hand side in FIG. 16.

The focusing optics 13 with the lenses 21, 22, and 23 is constructed similar to the focusing optics 13 of the distance measuring devices of the above examples.

The lens 21 or L1 is mounted in a mounting 90 being movable along the optical axis 14 of the focusing optics 13 or in Z-direction. The mounting 90 comprises a through hole 91 for the lens 21. At the perimeter of the through hole 91, a mirror ring 92 with a reflective surface 93 being tilted with respect to the optical axis 14 is provided.

The mounting 90 of the lens 21 is arranged on a slide 30' being movable along the optical axis 14 on a rail 95. The slide 30' comprises an encoder 96 for determining the absolute position of the slide with respect to the z axis or the optical axis 14. The rail 95 is fixed to a base plate 97. Using the encoder 96, the absolute position of the lens 21 and the absolute value of the movement z of the lens 21 with respect to a reference point can be determined. A fixed point for example at the base plate can be determined as reference point.

The reference branch 12' comprises an end mirror 18 with a focusing optics 19 being also mounted in the mounting.

A folded light way 15''' is provided between a retroreflector 17'' insert in a socket 98 and the mirror ring 92. In this embodiment, the retroreflector 17'' is configured as a cat's eye mirror.

Alternatively, a 90° prism can be used as a retroreflector. The socket 98 is mounted to the base plate 97 by a supporting bar 99.

The peripheral partial beam 81 is captured by the ring mirror 92 and is directed to the light way 15'' by twofold reflection at the tilted reflective surface of the ring mirror 92. On the way back, the partial beam 81 reaches the end mirror 18 by which it is reflected back towards the light source or the spectrometer of the OCT sensor, respectively.

During a movement of the lens 21 along the Z axis, the distance between the mounting 90 and the socket 98 also changes proportionally to the movement, so that the length of the folded light way 15'' or the optical path length of the light way 15'' also changes.

In this way, the optical path length of the reference arm 12 can be directly tracked to the movement of the focal point.

In contrast to the above examples, in this embodiment of the distance measuring device 1, a peripheral partial beam 81 of the collimated OCT light beam 7' is diverted for the reference arm 9, so that the intervention in the light guidance can be minimized.

Figure 17:
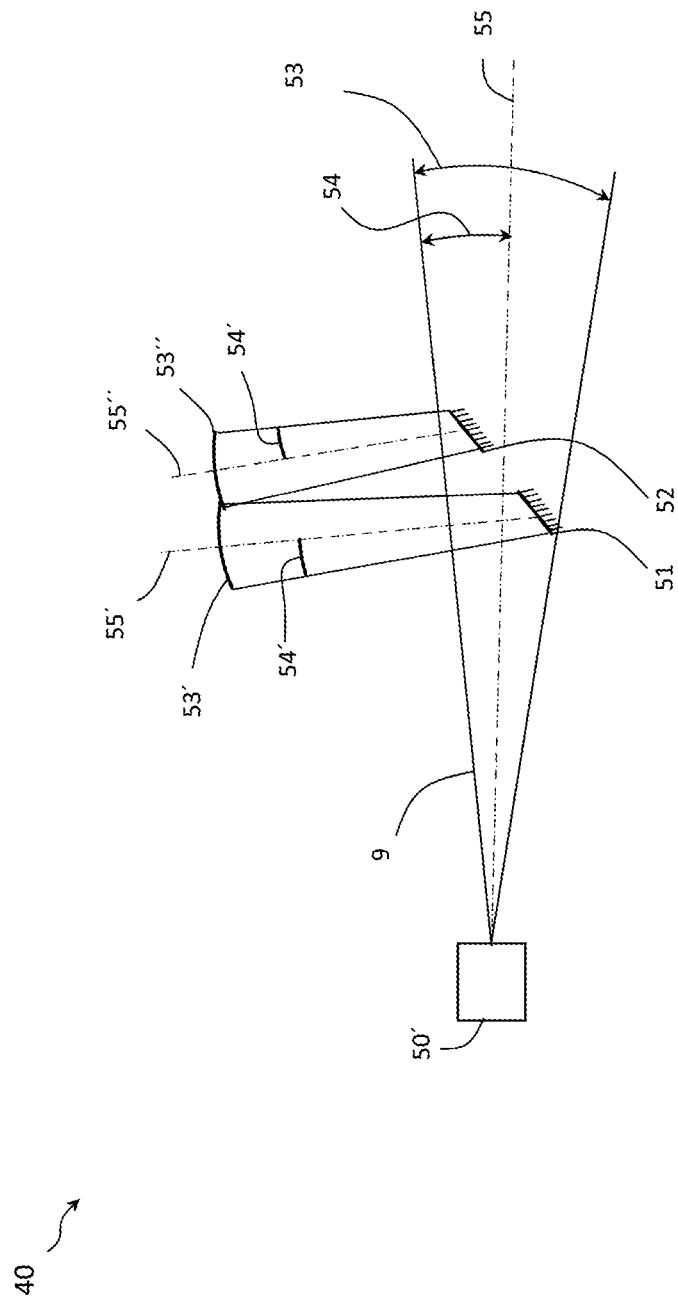
FIG. 17 shows a schematic configuration of a scanning device according to an embodiment.

FIG. 17 shows a schematic configuration of a scanning device according to an embodiment.

The measuring configuration 40 is provided for scanning a surface of an object to be measured. The scanning device 40 can be inserted between the beam expander and the object to be measured in the beam path of the distance measuring device according to one of the above embodiments.

The scanning device 40 comprises a mirror scanner 50' for expanding or for swiveling out the measuring light beam 9.

The scanning device 40 further comprises deflecting mirrors 51 and 52 or mirror segments which are configured as plane mirrors and which are arranged in the beam path of the measuring light such that each of the two deflecting mirrors can capture the measuring light and can scan a portion of the object be measured.

The mirror scanner 50' can be configured as a one-dimensional or as a two-dimensional scanner, so that the measuring light can be deflected or swiveled in one or two directions, respectively, wherein one deflecting mirror is provided per deflecting direction. For the sake of simplicity, a one-dimensional scanning device 40 is illustrated in FIG. 17. However, the scanning principle illustrated herein can be applied accordingly to the case of a two-dimensional mirror scanner.

While in operation, the focal point of the measuring light beam 9 describes a path of a circular segment 53 with a maximum deflection angle 54 from a standard direction 55 or an equilibrium direction.

Accordingly, the focal points of the light deflected by the deflecting mirrors 51 and 52 each describe a path of a circular segment 53' and 53'', respectively, with a maximum deflection angle 54' and 54'', respectively, from a respective equilibrium direction 55', 55'', wherein the paths of circular segments 53' and 53'' partially overlap. Thus, the region to be scanned of the surface of the object to be measured is split in two smaller portions. By splitting the region of the surface to be scanned in two portions, the total surface region can be scanned at a lower maximum deflection 54 of the measuring light beam 9.

The maximum deflection angle 54' and 54'' of the deflecting mirror 51 and 52, respectively, is 20°, which is significantly lower than the maximum deflection angle if the same scanning region was scanned by a single mirror. By reducing the maximum deflection angle, the defocusing effects and abaxial scatterings at the surface of the object to be measured caused by the circular trajectory of the respective focal point and the losses of measuring light and measuring errors resulting thereof can be reduced.

Using the mirror scanner 50', the maximum deflection angle as well as the maximum defocusing in a target plane for a given scanning region can be reduced, thereby allowing for a higher precision of the distance measurement. Additionally, by reducing the defocusing, a step of refocusing can be omitted, thereby expediting the measurement process.

As can be seen in FIG. 17, a gap exists between the two deflecting mirrors 51 and 52, so that the scanning device 40 provides a design choice or a configuration choice which can be used for measurements of objects to be measured with different geometry. For example, the deflecting mirrors 51 and 52 or further deflecting mirrors can be arranged in a conical measuring beam such that they each capture a partial beam without the need of splitting the measuring beam in two parts. Thus, a simultaneous measurement of two positions on the object to be measured can be avoided. Moreover, using such deflecting mirrors or partial mirrors allows for also measuring positions of the object to be measured with the OCT method which are difficult to access.

In order to draw a link between the partial topographies, it is not necessary to exactly know the position of the paths of circular segments attributed to the deflecting mirrors 51 and 52. It is sufficient to overlap the regions being captured likewise by two neighboring mirrors and their topography. In combination with the calibration data of the scanner, the position and the tilt of the deflecting mirrors can thereby be reconstructed.

On the other hand, using the deflecting mirrors or mirror segments and a plane mirror measuring object, a calibration of the scanner topography measurement can be performed which is also valid for a scanning device without mirror segments.

Figure 18:
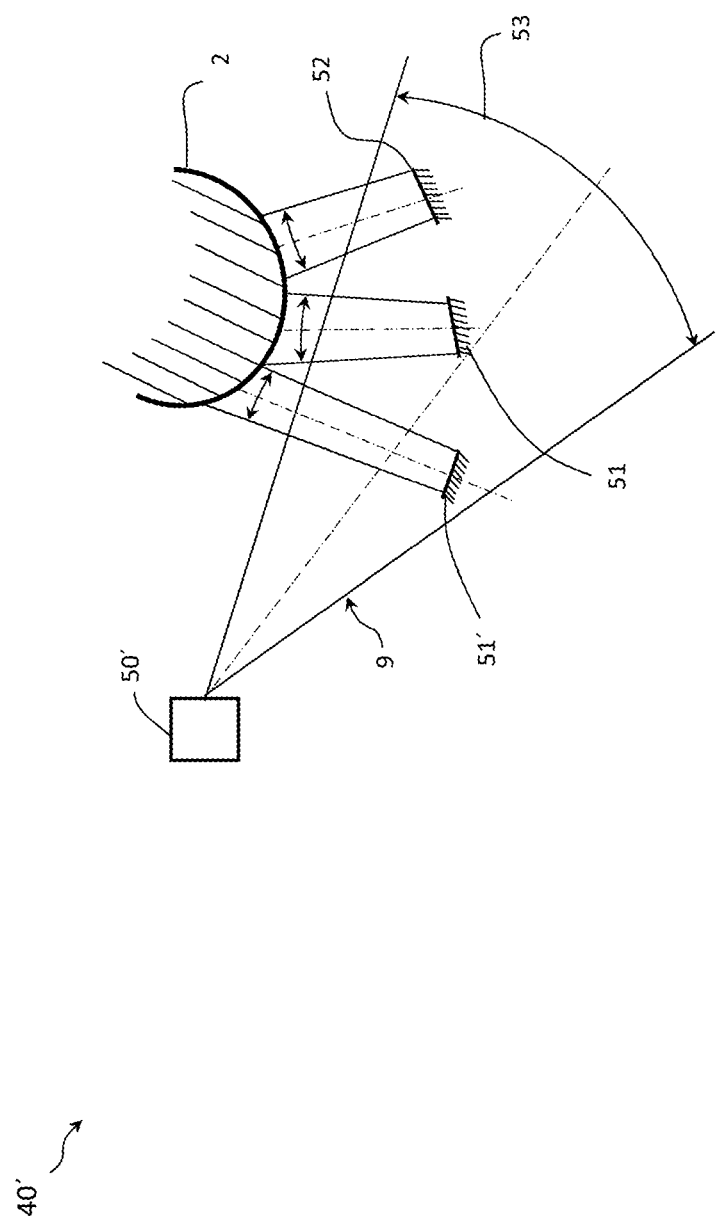
FIG. 18 shows a measuring configuration of a scanning device according to an embodiment.

FIG. 18 shows a measuring configuration of a scanning device according to an embodiment.

The illustrated measuring configuration 40' reveals how the concept of deflecting mirrors illustrated in FIG. 17 can also be expanded to measurements of non-planar objects to be measured.

Three deflecting mirrors 51, 51', and 52 are arranged in the light field of the measuring light being expanded by the mirror scanner. The measuring light is illustrated by measuring light beams 9 as continuous lines being directed to the object to be measured 2 by the deflecting mirrors 51, 51', and 52 or by the partial mirrors. The partial mirrors 51, 51', and 52 are positioned such that by deviating the measuring light beams 9 by the deflecting mirrors 51, 51', and 52, a respective portion of the surface of the object to be measured 2 can be scanned. The scanning motion of the light being directed by the partial mirrors is illustrated by curved double-sided arrows.

In this example, a cylindrical object is taken as an object to be measured. As illustrated, a cylindrical object to be measured can be scanned from three sides using the concept of partial mirrors, so that the OCT capturing of the topography of the object to be measured 2 can be performed in an efficient manner.

Figure 19:
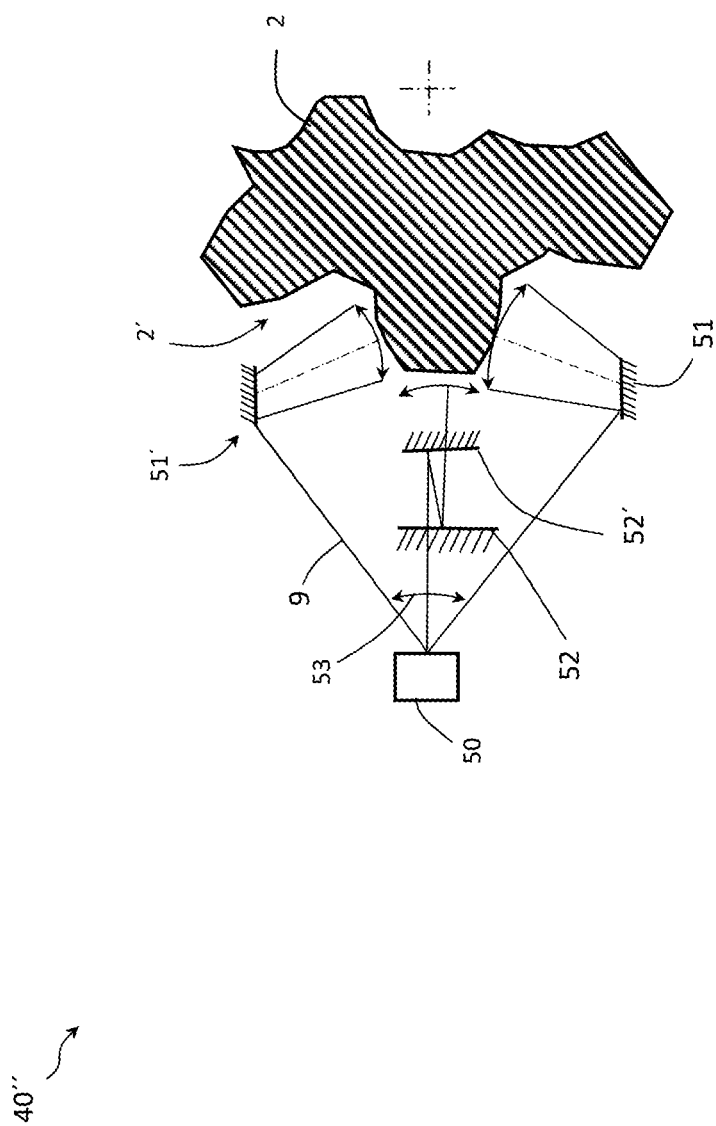
FIG. 19 shows a measuring configuration of a scanning device according to a further embodiment.

FIG. 19 shows a measuring configuration of a scanning device according to a further embodiment.

In the illustrated measuring configuration 40", the concept of deflecting mirrors is applied to a serrated surface of an object to be measured 2 provided as a gear wheel. The partial mirrors 51, 51', and 52 each capture a part of the measuring light 9, so that they each can scan a scanning region of the object to be measured 2. The scanning motion of the light being directed by the partial mirrors is illustrated by curved double-sided arrows.

In the beam path of the deflecting mirror 52 which scans the tooth 2' frontally, a compensating mirror 52' is provided. By adjusting the position of the compensating mirror 52', the shorter optical path for the frontally scanning light beam caused by the tooth geometry, in particular by the shorter distance of the front surface to the scanner, can be compensated for. Due to the substantially symmetrical geometry of the gear wheel, a partial mirror 51 and 51', respectively, is sufficient for the side surfaces of the tooth 2'.

Figure 20:
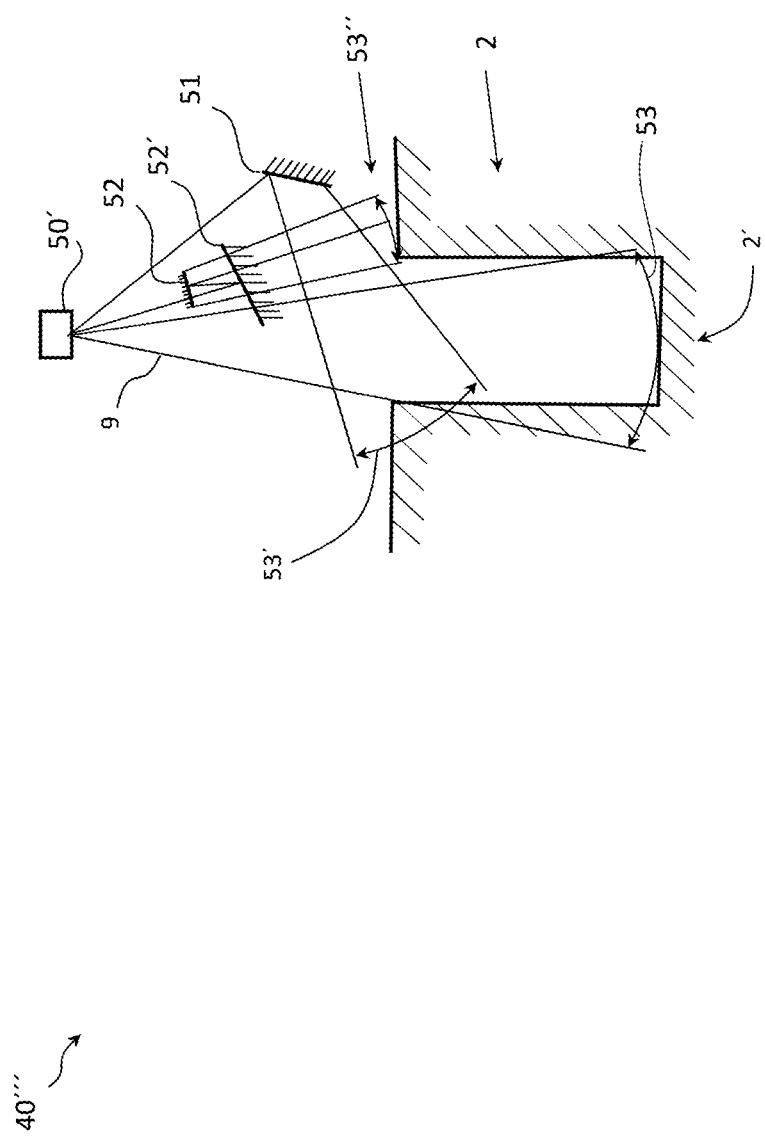
FIG. 20 shows a measuring configuration of a scanning device according to a further embodiment.

FIG. 20 shows a measuring configuration of a scanning device according to a further embodiment.

In this measuring configuration 40''', the concept of deflecting mirrors is applied to an object to be measured 2 with a deep trench 2'.

The scanning device 40 comprises a scanner 50' and deflecting mirrors 51, 52 as well as a compensating mirror 52' for compensating path differences.

Paths of circular segments 53, 53' and 53", which would be described by focal points of the measuring light in the absence of the object 2 are illustrated in FIG. 20. Scanning regions corresponding to these paths of circular segments are used for capturing different regions of the surface of the object to be measured. The measuring light being reflected by the deflecting mirror 51 is used for capturing the surface of the object to be measured 2 outside the trench 2". The light being directed directly by the mirror scanner 50' is used for capturing the bottom of the trench 2".

This mirror configuration allows for precisely measuring deep trenches or trenches with a high aspect ratio, in particular with an aspect ratio, i.e. with a ratio of the trench depth to the trench width, above 50.

Figure 21:
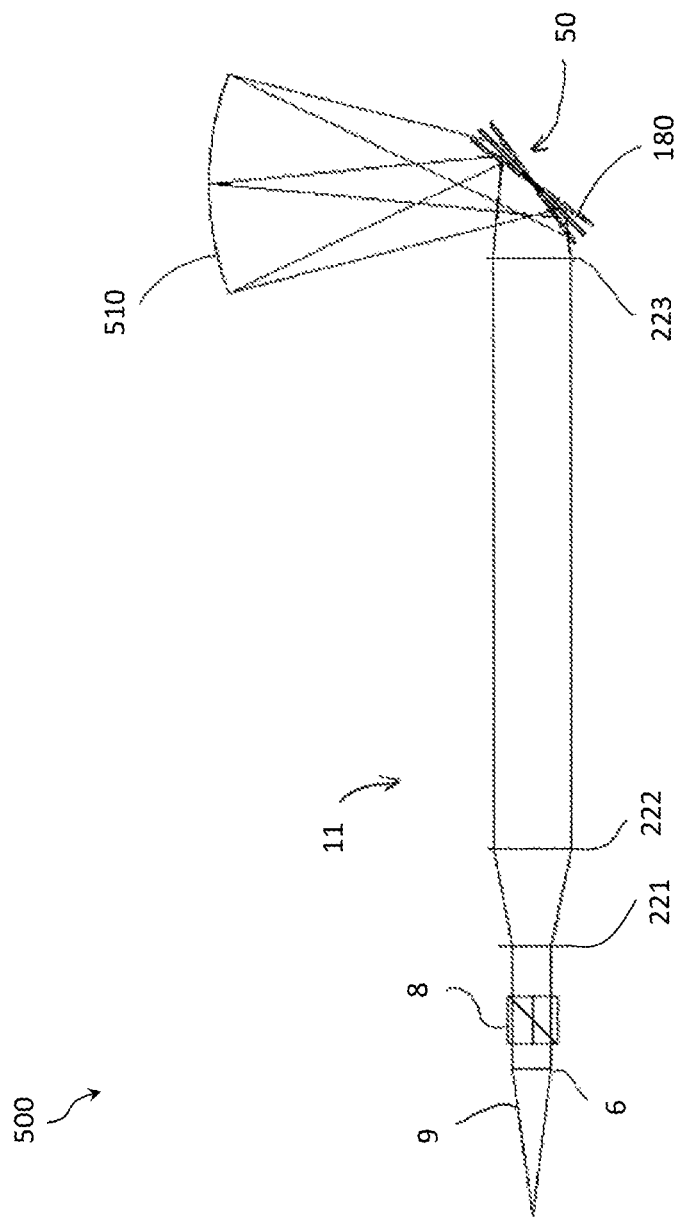
FIG. 21 shows schematically a scanner configuration according to an embodiment.

FIG. 21 shows schematically a scanner configuration according to an embodiment.

In the illustrated scanner configuration 500, a mirror scanner 50 is arranged downstream the beam forming optics of the object arm 11 with the lenses 221, 222, and 223. The illustration of FIG. 21 corresponds to a one-dimensional scanner with a scanner mirror 180 being pivotable around an axis being perpendicular to the drawing plane. However, the scanning principle illustrated herein can be applied accordingly to the case of a two-dimensional mirror scanner. The beam path is illustrated for three different positions of the scanner mirror 180. As illustrated in FIG. 21, the focal point of the measuring beam 9 moves along a circuit line 510 during pivoting the scanner mirror 180, so that the focal point describes a circular segment. This scanner configuration can thus be used in the scanning devices with deflecting mirrors as illustrated above for scanning portions of the surface of the object to be measured. The beam forming optics with lenses 221, 222, and 223 is only illustrated schematically here and may be configured as a beam expander according to one of the embodiments described above.

Figure 22:
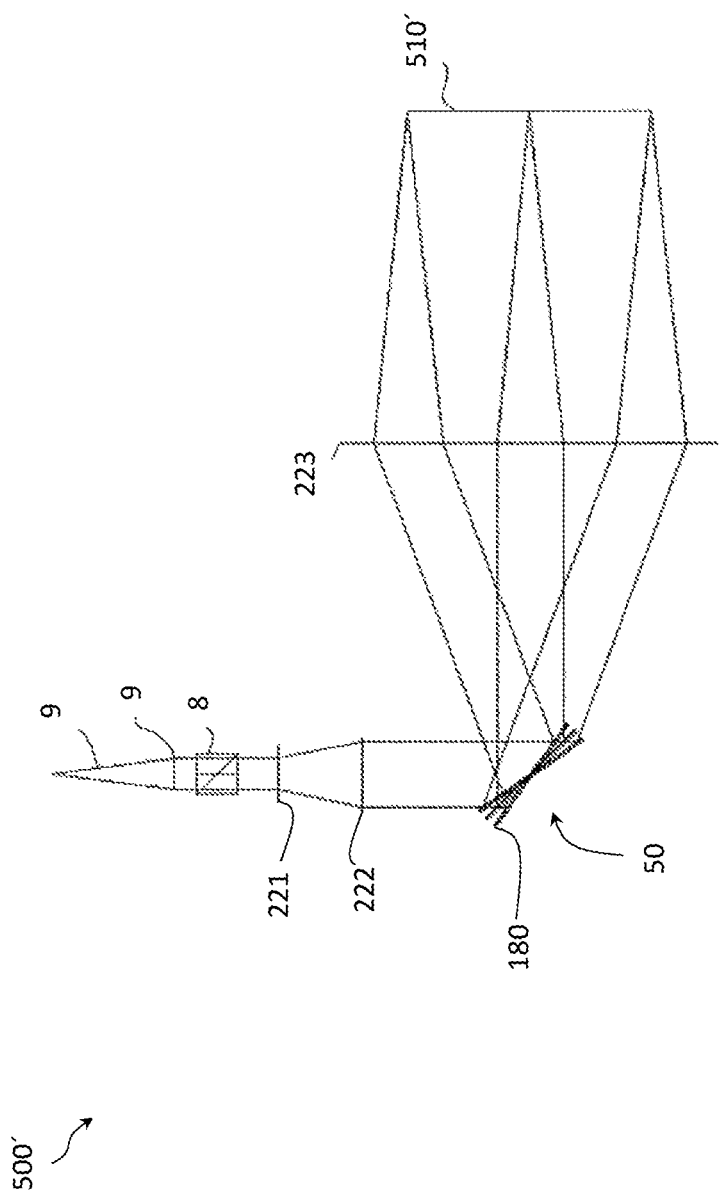
FIG. 22 shows schematically a scanner configuration according to a further embodiment.

FIG. 22 shows schematically a scanner configuration according to a further embodiment. With respect to essential components, the scanner configuration 500' of FIG. 22 corresponds to the scanner configuration of FIG. 21 with the difference that the mirror scanner 40 or the scanner mirror 180 is arranged between the two lenses 221 and 223, which leads to a telecentric beam path. This leads to a straight focus line 510' or to a focus plane in the case of a two-dimensional scanner. This scanner configuration without deflecting mirrors can be used in particular for objects to be measured with high planarity or with a topography which is not highly pronounced. In combination with deflecting mirrors—similar as in the scanning devices described above—the telecentric scanner configuration of FIG. 22 can also be used for highly stepped objects to be measured or for objects to be measured with a highly pronounced topography.

Although at least one exemplary embodiment was illustrated in the foregoing description, different variations and modifications can be carried out. The mentioned embodiments are merely examples and are not intended to limit the scope, the applicability or the configuration of the present disclosure in any way. Rather, the foregoing description provides a plan to the person skilled in the art for realizing at least one exemplary embodiment, wherein numerous changes in the function and the arrangement of elements described in an exemplary embodiment can be made without departing from the scope of protection of the attached claims and their legal equivalents.

Examples for different aspects of the application are listed below.

EXAMPLES

Example 1

A distance measuring device for measuring a distance to an object to be measured, comprising a beam splitter (8) for splitting broadband coherent light emitted by a light source (3) in measuring light being guided through an object arm (11) to the object to be measured and in reference light being guided to a reference arm (12), wherein a focusing optics (13, 13', 13", 13''', 13$^{IV}$) with a focus being movable along an optical axis of the object arm (11) is provided in the object arm (11) and wherein the focusing optics (13, 13', 13", 13''', 13$^{IV}$) comprises a movable optical element (21) and is configured such that a movement of the movable optical element (21) along the optical axis causes a higher movement of the focus of the focusing optics (13, 13', 13", 13''', 13$^{IV}$) along the optical axis and wherein the movable optical element (21) of the focusing optics (13, 13', 13", 13''', 13$^{IV}$) is coupled to the reference arm (9) such that the optical path length of the reference arm can be tracked synchronously with and dependent on the movement of the focus of the focusing optics (13, 13', 13", 13''', 13$^{IV}$).

Example 2

The distance measuring device according to example 1, wherein the movable optical element (21) is configured as a lens being movable along the optical axis and wherein the focusing optics (13, 13', 13", 13''', 13$^{IV}$) further comprises an immovable lens downstream the movable lens.

Example 3

The distance measuring device according to example 1 or 2, wherein the focusing optics (13, 13', 13", 13''', 13$^{IV}$) comprises a predefined numerical aperture and is configured such that the numerical aperture of the focusing optics (13, 13', 13", 13''', 13$^{IV}$) remains substantially constant during the movement of the focus of the focusing optics (13, 13', 13", 13''', 13$^{IV}$) by the movement of the movable optical element (21) along the optical axis.

Example 4

The distance measuring device according to one of examples 1 to 3, wherein the focusing optics (13, 13', 13", 13''', 13$^{IV}$) is configured as a three-lens beam expander.

Example 5

The distance measuring device according to example 1 or 4, wherein the movable optical element (21) is configured as a converging lens with a focal length $f_1$ being movable along the optical axis and wherein the focusing optics (13, 13', 13", 13''', 13$^{IV}$) further comprises an immovable diverging lens with a focal length $f_2$ and an immovable converging lens with a focal length $f_3$ and is configured such that, in paraxial approximation, a movement z of the movable lens causes a movement z'=F*z being proportional to said movement of the movable lens.

Example 6

The distance measuring device according to one of examples 1 to 4, wherein the movable optical element (21) is configured as a converging lens with a focal length $f_1$ being movable along the optical axis and wherein the focusing optics (13, 13', 13", 13''', 13$^{IV}$) further comprises an immovable converging lens with a focal length $f_2$ and an immovable converging lens with a focal length $f_3$ and is configured such that, in paraxial approximation, a movement z of the movable lens causes a movement z'=F*z being proportional to said movement of the movable lens.

Example 7

The distance measuring device according to one of examples 1 to 6, wherein a pivotable double mirror (100) with a retroreflector (120) is provided in the beam path of the focusing optics (13''', 13$^{IV}$).

Example 8

The distance measuring device according to one of examples 1 to 7, wherein the focusing optics (13, 13', 13", 13''') is configured such that the numerical aperture of the focusing optics (13, 13', 13", 13''') can take different predefined values.

Example 9

The distance measuring device according to example 5, wherein the focusing optics (13, 13', 13", 13''', 13$^{IV}$) is configured such that the focal lengths of the lenses fulfill the relationship $f_3 > f_1 > |f_2|$.

Example 10

The distance measuring device according to one of the preceding examples, wherein the reference arm (12) comprises a folded light way (15) with a folding number N and wherein an optical path delimiter (17) being movable in correlation with the movable optical element (21) for limiting the optical path length of the reference arm (12) is provided at one end of the folded light way (15).

Example 11

The distance measuring device according to one of examples 1 to 10, wherein the folded light way (15) is provided by two path delimiters (16, 17) and wherein the two path delimiters (16, 17) are configured as prismatic optical elements, wherein one of the two prismatic optical elements is pivotable around an axis which is parallel to the folded light way (15), such that the folding number N of the folded light way is adjustable by rotating the pivotable prismatic optical element.

Example 12

The distance measuring device according to one of examples 1 to 11, wherein a twin of the folded light way (15) is provided in the object arm (11).

Example 13

The distance measuring device according to one of examples 10 to 12, wherein the optical path delimiter (17) and the movable optical element (21) can perform a translatory motion together and wherein the focusing optics (13, 13', 13", 13''', 13$^{IV}$) is dimensioned such that the proportionality factor F of the focusing optics (13, 13', 13", 13''', 13$^{IV}$) and the folding number N of the folded light way (15) are equal.

Example 14

The distance measuring device according to one of the preceding examples, wherein an encoder (96) for outputting a current position z of the movable optical element (21) is provided.

Example 15

The distance measuring device according to example 14, wherein an absolute arm's length of the reference arm (12) can be determined using a calibration table with a stored dependency $Z_{reference}(Z)$.

Example 16

The distance measuring device according to one of the preceding examples, wherein the distance measuring device comprises a calibration branch (59, 59"), wherein the calibration branch (59, 59") comprises a reference plate (60) with position indicators (61) for calibration verification of the distance measuring device (1).

Example 17

The distance measuring device according to example 16, wherein the position indicators (61) are configured as glass beads with a refractive index n of 1.95 to 2.00.

Example 18

The distance measuring device according to example 16 or 17, wherein the reference plate (60) is provided in the object arm (11) of the distance measuring device (1).

Example 19

The distance measuring device according to one of the preceding examples, wherein the distance measuring device (1) further comprises a scanning device (50) for scanning a measuring range of the surface of the object to be measured.

Example 20

The distance measuring device according to example 19, wherein the scanning device (50) comprises at least one deflecting mirror (51, 51', 52) for capturing at least a part of the measuring light and for scanning at least one dedicated portion of the surface of the object to be measured.

Example 21

The distance measuring device according to example 20, wherein a maximum deflection of the measuring beam from a central direction during scanning the portion of the surface of the object be measured is +/−20°, in particular +/+10°.

Example 22

A method for measuring distances, comprising:
providing a distance measuring device, comprising a beam splitter for splitting broadband coherent light emitted by a light source in measuring light being guided through an object arm to an object to be measured and in reference light being guided to a reference arm with a folded beam path, wherein a focusing optics with a focal point being movable along an optical axis of the object arm is provided in the object arm, the focusing optics being configured as a beam expander,
positioning the object to be measured in a measuring position,
focusing the measuring light at a measuring point of the surface of the object to be measured by moving the focal point of the focusing optics to the measuring point,
measuring the distance to the measuring point using an OCT method while simultaneously compensating for the path difference in the reference arm caused by the movement of the focal point.

Example 23

The method according to example 22, wherein focusing the measuring light comprises passing through a focus range along the optical axis with the focal point, and wherein a position of the focal point with a strongest OCT distance signal is used for measuring the distance.

Example 24

The method according to example 22 or 23, wherein the method further comprises:
measuring the distance to a first measuring point of the surface of the object to be measured in a first measuring position of the object to be measured,
moving the object to be measured to a second measuring position,
measuring the distance to a second measuring point of the surface of the object to be measured in the second measuring position of the object to be measured,
and wherein moving the object to be measured to the second measuring position comprises a translatory motion of the object to be measured.

Example 25

The method according to one of examples 22 to 24, wherein the method comprises scanning a measuring range of the object to be measured with a scanning device.

Example 26

The method according to one of examples 22 to 25, wherein the method comprises approaching predetermined check measuring positions with the focal point and measuring the distances at the check measuring positions.

Example 27

The method according to example 26, wherein the scanning device comprises at least one deflecting mirror for capturing at least a part of the measuring light, and wherein the method comprises scanning at least one dedicated portion of the surface of the object to be measured with the at least one deflecting mirror.

Example 28

The method according to example 27, wherein a current position of the focal point (x,y,z) is determined as a function of a current position of the deflecting mirror using a calibration table.

Example 29

The method according to one of examples 27 to 28, wherein the at least one deflecting mirror comprises a reflecting surface applied to the object to be measured.

Example 30

The method according to one of examples 22 to 29, wherein the object to be measured comprises a material being at least partially transparent for the measuring light, and wherein the method comprises measuring the distance to a surface measuring point in transmission mode.

Example 31

The method according to one of examples 22 to 30, wherein the distance measuring device comprises an imaging system, and wherein the measuring light is guided via the imaging system to the object to be measured.

REFERENCE NUMERALS

1 distance measuring device
2 object to be measured
2' tooth
2" trench
3 light source
4 broadband coherent light 5 optical fiber
6 collimator
7 light beam
8 beam splitter
9 measuring light beam
10 reference light beam
11 object arm
12, 12' reference arm
13, 13', 13", 13''', 13IV focusing optics
14 optical axis
15, 15', 15" folded light way
16, 17, 17', 17" path delimiter
18 end mirror
19 focusing optics
20, 20' adjusting mirror
21, 22, 23 lenses
25 focal point
26 spectrometer
28 housing
30, 30' slide
31 direction of movement of the slide
32 mechanical connection
40, 40', 40", 40''' measuring configuration
50 scanner
51, 51', 52 deflecting mirror
52' compensating mirror
53, 53', 53" path of a circular segment
54, 54', 54" maximum deflecting angle
55, 55', 55" standard direction
59, 59' calibration branch
60 reference plate
61 indicator
62 entering mirror
70 air gap
71, 72 plane mirror
80 beam path
81 peripheral partial beam
90 mounting
91 through hole
92 mirror ring
93 reflective surface
95 rail
96 encoder
97 base plate
98 socket
99 supporting bar
100, 100' pivotable double mirror
101, 101', 102, 102' plane mirror
103 edge of the double mirror
105 main branch
110 secondary branch
120 rectangular prism
122 collimator lens
130, 131 double mirror region
135 pair of mirrors
136, 137 plane mirror
140 retroreflector
150, 151, 152, 153 plane mirror
160, 161 retroreflector
180 scanner mirror
221, 222, 223 lenses
500, 500' scanner configuration
510, 510' focus line

What is claimed is:

1. A distance measuring device for measuring a distance to an object to be measured, comprising:

a beam splitter for splitting broadband coherent light emitted by a light source in measuring light being guided through an object arm to the object to be measured and in reference light being guided to a reference arm;

wherein a focusing optics with a focus being movable along an optical axis of the object arm is provided in the object arm and wherein the focusing optics comprises a movable optical element and is configured such that a movement of the movable optical element along the optical axis causes a higher movement of the focus of the focusing optics along the optical axis; and wherein the movable optical element of the focusing optics is coupled to the reference arm such that an optical path length of the reference arm can be tracked synchronously with and dependent on the movement of the focus of the focusing optics.

2. The distance measuring device according to claim 1, wherein the movable optical element is configured as a lens being movable along the optical axis and wherein the focusing optics further comprises an immovable lens downstream the movable lens.

3. The distance measuring device according to claim 2, wherein the focusing optics comprises a predefined numerical aperture and is configured such that the numerical aperture of the focusing optics remains substantially constant during the movement of the focus of the focusing optics by the movement of the movable optical element along the optical axis.

4. The distance measuring device according to claim 3, wherein the focusing optics is configured as a three-lens beam expander.

5. The distance measuring device according to claim 4, wherein the movable optical element is configured as a converging lens with a focal length $f_1$ being movable along the optical axis and wherein the focusing optics further comprises an immovable diverging lens with a focal length $f_2$ and an immovable converging lens with a focal length $f_3$ and is configured such that, in paraxial approximation, a movement z of the movable lens causes a movement $z'=F*z$ being proportional to said movement of the movable lens.

6. The distance measuring device according to claim 4, wherein the movable optical element is configured as a movable converging lens with a focal length $f_1$ being movable along the optical axis and wherein the focusing optics further comprises a first immovable converging lens with a focal length $f_2$ and a second immovable converging lens with a focal length $f_3$ and is configured such that, in paraxial approximation, a movement z of the movable converging lens causes a movement $z'=F*z$ being proportional to said movement of the movable converging lens.

7. The distance measuring device according to claim 6, wherein a pivotable double mirror with a retroreflector is provided in a beam path of the focusing optics.

8. The distance measuring device according to claim 7, wherein the focusing optics is configured such that the predefined numerical aperture of the focusing optics can take different predefined values.

9. The distance measuring device according to claim 5, wherein the focusing optics is configured such that the focal lengths $f_1$, $f_2$, and $f_3$ fulfill a relationship expressed as $f_3 > f_1 > |f_2|$.

10. The distance measuring device according to claim 9, wherein the reference arm comprises a folded light way with a folding number N and wherein an optical path delimiter being movable in correlation with the movable optical element for limiting the optical path length of the reference arm is provided at one end of the folded light way.

11. The distance measuring device according to claim 10, wherein the folded light way is provided by two path delimiters configured as prismatic optical elements, wherein one of the prismatic optical elements is pivotable around an axis which is parallel to the folded light way, such that the folding number N of the folded light way is adjustable by rotating the one of the prismatic optical element.

12. The distance measuring device according to claim 11, wherein a twin of the folded light way is provided in the object arm.

13. The distance measuring device according to claim 12, wherein the optical path delimiter and the movable optical element can perform a translatory motion together and wherein the focusing optics is dimensioned such that a proportionality factor F of the focusing optics and the folding number N of the folded light way are equal.

14. The distance measuring device according to claim 13, wherein an encoder for outputting a current position z of the movable optical element is provided.

15. The distance measuring device according to claim 14, wherein an absolute arm's length of the reference arm can be determined using a calibration table with a stored dependency $z_{reference}(Z)$.

16. The distance measuring device according to claim 1, wherein the distance measuring device comprises a calibration branch, wherein the calibration branch comprises a reference plate with position indicators for calibration verification of the distance measuring device.

17. The distance measuring device according to claim 16, wherein the position indicators are configured as glass beads with a refractive index n of 1.95 to 2.00.

18. A method for measuring distances, comprising:
  providing a distance measuring device, comprising a beam splitter for splitting broadband coherent light emitted by a light source in measuring light being guided through an object arm to an object to be measured and in reference light being guided to a reference arm with a folded beam path, wherein a focusing optics with a focal point being movable along an optical axis of the object arm is provided in the object arm, the focusing optics being configured as a beam expander;
  positioning the object to be measured in a measuring position;
  focusing the measuring light at a measuring point of a surface of the object to be measured by moving the focal point of the focusing optics to the measuring point; and
  measuring a distance to the measuring point using an OCT method while simultaneously compensating for a path difference in the reference arm caused by movement of the focal point.

19. The method according to claim 18, wherein focusing the measuring light comprises passing through a focus range along the optical axis with the focal point, and wherein a position of the focal point with a strongest OCT distance signal is used for measuring the distance to the measuring point.

20. The method according to claim 18, wherein the method further comprises:
  measuring a first distance to a first measuring point of the surface of the object to be measured in a first measuring position of the object to be measured,
  moving the object to be measured to a second measuring position;
  measuring a second distance to a second measuring point of the surface of the object to be measured in the second measuring position of the object to be measured; and
  wherein moving the object to be measured to the second measuring position comprises a translatory motion of the object to be measured.

* * * * *